(12) United States Patent
Doi

(10) Patent No.: US 7,360,884 B2
(45) Date of Patent: Apr. 22, 2008

(54) INK JET RECORDING METHOD AND INK JET RECORDING APPARATUS

(75) Inventor: Takatsugu Doi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 378 days.

(21) Appl. No.: 11/129,997

(22) Filed: May 16, 2005

(65) Prior Publication Data

US 2005/0259138 A1 Nov. 24, 2005

(30) Foreign Application Priority Data

May 24, 2004 (JP) .......................... 2004-153817
Jan. 19, 2005 (JP) .......................... 2005-011814

(51) Int. Cl.
*C09D 11/00* (2006.01)

(52) U.S. Cl. .................................... 347/100
(58) Field of Classification Search ............... 347/100
See application file for complete search history.

(56) References Cited

U.S. PATENT DOCUMENTS

2006/0066661 A1* 3/2006 Yamashita et al. ............ 347/21

FOREIGN PATENT DOCUMENTS

| JP | 2667401 | 6/1997 |
|---|---|---|
| JP | 9-254376 | 9/1997 |
| JP | 2001-294788 | 10/2001 |

* cited by examiner

*Primary Examiner*—Manish S. Shah
*Assistant Examiner*—L Martin
(74) *Attorney, Agent, or Firm*—Fildes & Outland, P.C.

(57) ABSTRACT

The invention provides an ink jet recording method which includes ejecting an ink set. The ink set includes a first liquid which includes a colorant, a water soluble solvent and water, and a second liquid which includes a coagulating agent, a water soluble solvent and water. Recording in a double sided print mode and recording in a single sided print mode are possible. The following Expression (1) is satisfied.

$$0.01 < \frac{RD_2 \times RM_1}{RD_1 \times RM_2} < 1 \quad \text{Expression (1)}$$

In Expression (1), $RD_1$ is an application amount per unit area of the first liquid in double sided printing mode. $RD_2$ is an application amount per unit area of the second liquid in double sided printing mode. $RM_1$ is an application amount per unit area of the first liquid in single sided printing mode. $RM_2$ is an application amount per unit area of the second liquid in single sided printing mode.

20 Claims, 2 Drawing Sheets

INK JET RECORDING METHOD AND INK JET RECORDING APPARATUS

CROSS-REFERENCE TO RELATED APPLICATION

This application claims priority under 35 USC 119 from Japanese Patent Application Nos. 2004-153817 and 2005-011814, the disclosures of which are incorporated by reference herein.

BACKGROUND OF THE INVENTION

1. Field of Invention

The present invention relates to an ink jet recording method and an ink jet recording apparatus.

2. Description of the Related Art

An ink jet method, which ejects an ink from an opening of a nozzle, a slit, or a porous film, is compact and low-cost and therefore has been widely used in various printers. Among such an ink jet method, a piezo ink jet method using deformation of a piezoelectric element to eject an ink, and a thermal ink jet method using thermal energy to boil and thereby eject an ink can print high-resolution images at high speed.

In the field of ink jet printers, one of the important tasks is high-speed printing of a high-quality image on plain paper. In order to achieve this task, an ink jet recording method has been proposed which includes the steps of applying a liquid containing a compound with a cationic group onto a recording medium, and applying an ink containing an anionic dye to form an image immediately after the liquid penetrates into the recording medium, disappears from the surface of the recording medium, and remains in the recording medium (see Japanese Patent No. 2,667,401)

Further, to achieve rapid drying, high optical density, and high image quality, a color ink set has been proposed in which a black ink contains water and a water-soluble solvent and shows a drying time of 5 seconds or less on plain paper, and each of color inks contains a colorant, water, a water-soluble solvent, and a coagulating agent for coagulating a component of the black ink and shows a penetrating time of 5 seconds or less into plain paper (see Japanese Patent Application Laid-Open (JP-A) No. 2001-294788)

Also, an ink jet printing method is proposed (see JP-A 9-254376) which is an ink jet printing method for double sided printing on a recording medium comprising a step of selecting one of either a double sided printing mode or single sided printing mode. Here, when the double sided printing mode is selected, another selection step is provided between: a treatment liquid print mode, in which a treatment liquid is applied to the recording medium; and, a low density printing mode, in which the amount of ink ejected onto the recording medium is reduced.

However, with the above methods, because the aim is to improve image quality, in the likes of optical density, bleeding, and inter color bleeding, not enough consideration has been made of drying time or fixation time. In particular, when undertaking high speed printing at the same time as double sided printing, because of contact of the printed surface with feeding rollers and such paper conveying structural elements just after printing, colorant can get stuck to the paper conveying structural elements. This stuck-on colorant can be re-transferred onto the image area and it is clear that dirty images can occur. Accordingly, technologies for improving not only drying time and fixation, but also image characteristics such as optical density, bleeding, and intercolor bleeding, have been required.

SUMMARY OF THE INVENTION

The invention has been achieved in consideration of the above-described problems.

In other words, the invention provides an ink jet recording method with improved image quality in optical density, bleeding, and inter color bleeding as well as satisfactory drying times and fixation properties enabling dirty images to be avoided.

Namely, the invention provides an ink jet recording method which prints out by ejecting onto a recording medium an ink set for ink jet use, in which: the ink set includes at least a first liquid including a colorant, a water soluble solvent and water; and a second liquid includes at least a coagulating agent, a water soluble solvent and water; recording in a double sided print mode and recording in a single sided print mode are possible; and the relationship of the following Expression (1) is satisfied.

$$0.01 < \frac{RD_2 \times RM_1}{RD_1 \times RM_2} < 1 \quad \text{Expression (1)}$$

In Expression (1), $RD_1$ is an application amount per unit area of the first liquid in double sided printing mode. $RD_2$ is an application amount per unit area of the second liquid in double sided printing mode. $RM_1$ is an application amount per unit area of the first liquid in single sided printing mode. $RM_2$ is an application amount per unit area of the second liquid in single sided printing mode.

Further, the invention provides an ink jet recording apparatus which is provided with a recording head which ejects the above-described ink set onto a recording medium.

BRIEF DESCRIPTION OF THE DRAWINGS

Preferable embodiments of the invention will be described in detail based on the following figures.

DETAILED DESCRIPTION OF THE INVENTION

Figure 1:
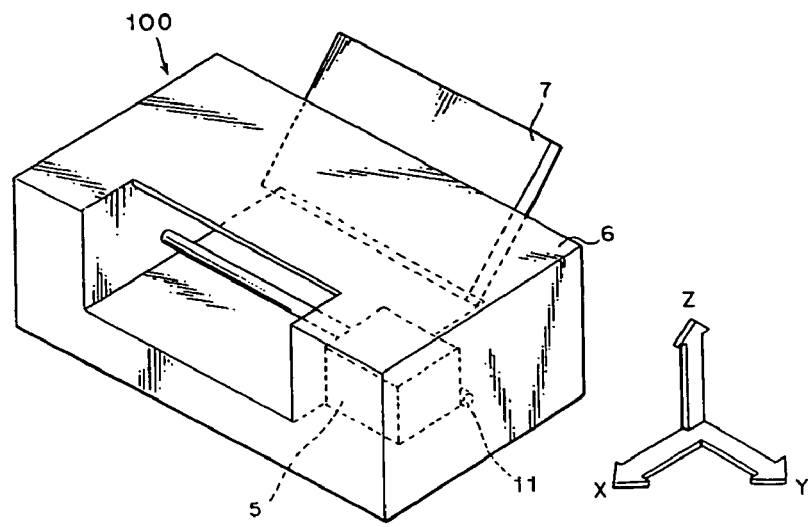
FIG. 1 A perspective view showing an appearance of a constitution of an ink jet recording apparatus according to a preferred embodiment of the invention.

Hereinafter, details of the ink jet recording method and the ink jet recording apparatus of the invention are described.

Ink Jet Recording Method

The ink jet recording method of the invention is an ink jet recording method which prints out by ejecting onto a recording medium an ink set for ink jet use, in which: the ink set includes at least a first liquid including a colorant, a water soluble solvent and water; and a second liquid includes at least a coagulating agent, a water soluble solvent and water; recording in a double sided print mode and recording in a single sided print mode are possible; and the relationship of the following Expression (1) is satisfied.

$$0.01 < \frac{RD_2 \times RM_1}{RD_1 \times RM_2} < 1 \qquad \text{Expression (1)}$$

According to the invention, where $RD_1$, $RD_2$, $RM_1$ and $RM_2$ indicate the amount of each of the treatment liquids applied per unit area to the recording medium in the double sided printing mode and the single sided printing mode respectively, these application amounts satisfy the relationship shown in Expression (1).

For the treatment liquids like the first liquid and second liquid of the invention, it is known that when two or more liquids are mixed, when a liquid which causes an increase in viscosity or coagulation is used, image quality can be improved in optical density, bleeding and inter color bleeding. Regarding this mechanism, there are 2 actions thought to occur:

(i) the colorant in the first liquid rapidly is coagulated, and the colorant separates from the aqueous solvent such as water and water-soluble solvent (cohesiveness);

(ii) the aqueous solution alone penetrates into the recording medium (permeability).

When the coagulation ability is sufficient for the permeability then raised image quality can be sufficiently realized, however, it tends to extend the drying time. On the other hand, when the permeability is sufficiently high for the coagulation ability then the drying time gets quicker but the ability to realize raised image quality is lost.

In the past, emphasis has been put on improving optical density, bleeding, and inter color bleeding and so ink sets have been designed where the coagulation ability is sufficiently great for the permeability. As a result of this, it has become clear that ink sets like this generate dirty images, especially when applied to high speed printing combined with double sided printing. The mechanism of the generation of dirty images is not clear but it can be supposed that the cause is that when the coagulation ability becomes greater than the permeability then the drying time becomes unable to cope with high speed printing, and the amount of colorant which remains on the surface of the recording material becomes great. Put in another way, a condition is formed where on the surface of the recording material is a large amount of colorant that has not sufficiently dried. It can be supposed that this non-dry colorant accumulates on the paper conveying elements, such as the feeding rollers, and these parts re-transfer the colorant to the recording medium, causing the dirty images.

In order to solve this drawback, it is proposed that when double sided printing the application amount of the ink (first liquid) is reduced. However, even with this method, the occurrence of localized dirty images which high speed double sided printing has been proven. It is supposed to be because in areas where there is sufficient treating liquid (second liquid) that in order to be able to print with the ink (first liquid), when the ink application areas are looked at, the ink drying is slow, and there is a condition where there is a great amount of colorant.

As a result of extensive investigations the present invention has been made which provides improved optical density, bleeding, and inter color bleeding properties as well as speeding the drying time of the ink (colorant)—making it possible to prevent the occurrence of dirty images. In order to do this it is necessary that: the application amount per unit area of the first liquid in double sided printing mode $RD_1$, and the application amount per unit area of the second liquid in double sided printing mode $RD_2$, the application amount per unit area of the first liquid in single sided printing mode $RM_1$ and the application amount per unit area of the second liquid in single sided printing mode $RM_2$, satisfy the relationship shown in Expression (1).

In the ink jet recording method of the invention, the preferable value for $[(RD_2 \times RM_1)/(RD_1 \times RM_2)]$ is 0.1 or more but less than 1, and more preferably it is 0.5 or more but less than 0.9.

When the value of $[(RD_2 \times RM_1)/(RD_1 \times RM_2)]$ is more than 1, the drying speed of the colorant is slow, and dirty images occur. However, if $[(RD_2 \times RM_1)/(RD_1 \times RM_2)]$ is less than 0.01 then there is the problem that sufficient optical density is not obtainable.

The following methods are examples of ways of satisfying the above Expression (1): a) adjusting the number of pixels applied of the first liquid and/or the second liquid; b) adjusting the amount of the first liquid applied per pixel and/or the amount of the second liquid applied per pixel. In the method b) it is preferable that adjusting the amount of the first liquid applied per pixel and/or the amount of the second liquid applied per pixel is carried out by altering the wave pattern of the applied voltage to the liquid(s) as they are discharged. Also, in both methods a) and b) it is preferable that the amount of the second liquid applied per unit area $RD_2$ is appropriately reduced when printing in double sided print mode.

In the ink jet recording method of the invention, for printing with the same color, it is preferable that the application amount per unit area of the first liquid in double sided printing mode $RD_1$, and the application amount per unit area of the first liquid in single sided printing mode $RM_1$ satisfy the relationship shown in Expression (2) below.

$$0.01 < RD_1/RM_1 < 1 \qquad \text{Expression (2)}$$

The preferable value for $(RD_1/RM_1)$ in the ink jet recording method of the present invention is 0.1 or over but less than 1, and more preferably it is 0.5 or over but less than 9.

When the value of $(RD_1/RM_1)$ is more than 1, the drying speed of the colorant is slow, and such problems as dirty images, curling and cockling can occur. However, if $(RD_1/RM_1)$ is less than 0.01 then there is the problem that sufficient optical density is not obtainable.

Here, in this invention, by "printing with the same color" is meant that the Δvalue of ΔE of CIELAB (Commission International de l'Eclairage Lab) color space of printed pixels is less than 3.

The following methods are examples of ways of satisfying the above Expression (2): a') adjusting the number of pixels applied of the first liquid in the double and single sided print modes; b') adjusting the amount of the first liquid applied per pixel in the double and single sided print modes. In the method b') it is preferable that adjusting the amount of the first liquid applied per pixel is carried out by altering the wave pattern of the applied voltage to the liquids as they are discharged.

Also, in both methods a') and b') it is preferable that the amount of the first liquid applied per unit area $RD_1$ is appropriately reduced in the double sided print mode.

In the invention, the application amount of each of the first liquid and the second liquid is preferably in a range of about 0.01 to 25 ng per pixel. The application amount of the first liquid per pixel is more preferably about 0.1 to about 20 ng, and still more preferably about 0.5 to about 8 ng. The application amount of the second liquid per pixel is more preferably about 0.1 to about 15 ng, and still more preferably about 0.5 to about 4 ng. When the application amount of each of the first liquid and the second liquid per pixel is more than 25 ng, bleeding occurs or drying time of the colorant lengthens in some cases. The reason of occurrence of the bleeding is thought to be as follows. The contact angle of each of the ink and the liquid composition with respect to a recording medium depends on the amount of a droplet. Therefore, as the amount of a droplet increases, the droplet tends to more easily spread on paper. On the other hand, when the application amount of each of the first liquid and the second liquid per pixel is less than 0.01 ng, deterioration in reliability such as a nozzle clogging may occurs.

In the invention, the term "(one) pixel" means a minimum of printing units obtained by resolving an image, and the size of the minimum printing unit mainly depends on the resolution of a print head and the resolution of a recording medium in a recording medium feeding direction. Therefore, a product of the application amount of the first liquid per pixel by the number of pixels per unit area is the total application amount of the first liquid necessary to form the unit area, and a product of the application amount of the second liquid per pixel by the number of pixels per unit area is the total application amount of the second liquid necessary to form the unit area.

When the invention is applied in a single-sided printing mode, the mass ratio of the application amount of the first liquid per unit area to that of the second liquid per unit area is preferably about 100:5 to about 100:100, more preferably about 100:5 to about 100:50, and still more preferably about 100:10 to about 100:20. When the mass ratio of the application amount of the second liquid per unit area to that of the first liquid per unit area is less than 5/100, coagulation becomes insufficient, which may cause optical density deterioration, bleeding and intercolor bleeding. On the other hand, when the mass ratio of the application amount of the second liquid per unit area to that of the first liquid per unit area is more than 100/100, curling and cockling of the recording medium may deteriorate.

When the invention is applied in a double-sided printing mode, the mass ratio of the application amount of the first liquid per unit area to that of the second per unit area is preferably about 100:1 to about 100:50, more preferably about 100:1 to about 100:25, and still more preferably about 100:2 to about 100:15. When the mass ratio of the application amount of the second liquid per unit area to that of the first liquid per unit area is less than 1/100, coagulation becomes insufficient, which may cause optical density deterioration, bleeding and intercolor bleeding. On the other hand, When the mass ratio of the application amount of the second liquid per unit area to that of the first liquid per unit area is more than 25/100, stains on an image may occur in high-speed, double-sided printing.

In the present invention it is preferable that mutual contact occurs on the surface of the recording medium between the first liquid and the second liquid, when the first liquid and the second liquids are applied. This is because by the mutual contact between the first liquid and the second liquid, the liquids coagulate due to the action of the coagulating agent(s), the recording method becomes one superior in optical density, bleeding and inter color bleeding properties, and drying times. As long as there is mutual contact then it does not mater if the application is mutually adjacent, or the application gives a covering, however application to give a covering is preferable.

Also, regarding the sequence of application (ejection) the first liquid is applied after application of the second liquid. This is because by applying the second liquid first, it is possible to effectively coagulated the structural components in the first liquid. As long as the second liquid is applied after the first liquid this can be done at any time. It is preferable to apply the first liquid 0.1 seconds or less after the application of the second liquid.

A number of particles having a particle diameter of not less than 5 μm in a mixed liquid of equal amounts of the first and second liquids are preferably about 500 to about 1,000, 000 particles per μl, more preferable 500 to 100,000 particles per μl, and still more preferably about 500 to about 30,000 particles per μl. If the number of coarse particles in the liquid mixture of the first liquid and second liquid of size over 5 μm are less than about 500 particles per μl then optical density can decrease. Also, if the number of coarse particles in the liquid mixture of the first liquid and second liquid of size over 5 μm are more than about 1,000,000 particles per μl then areas covered by the dots can be too small and the problem of insufficient optical density being achieved occurs.

In the present invention the number of coarse particles over 5 μm is measured by mixing the first and the second liquids in the ratio of 1:1, stirring and taking a sample of 2 μl and using an Accusizer™ 770 Optical Particle Sizer (Manufactured by Particle Sizing Systems Ltd). As the density of the dispersed particle parameter for the measurement the density of the colorant is entered. This colorant density can be obtained by heating the colorant dispersion liquid, and, by drying, measuring the obtained colorant powder using a densitometer or a pycnometer.

Regarding the type of ink jet recording method for the present invention it is preferable, from the perspectives of resulting improvement in the bleeding and inter color bleeding, to use thermal ink jet printing, or piezo ink jet printing methods. The reason for this is not clear but in the case of thermal ink jet printing, at the time of ejection heat is applied to the ink, and it becomes very low in viscosity. But since the temperature of the ink decreases on the surface of the recording medium, the viscosity rapidly increases. It can be supposed that bleeding and intercolor bleeding properties are improved as a result. Also in the case of piezo ink jet printing, it is possible to eject liquids of high viscosity, and by doing so the spreading out of the high viscosity liquids on the surface of the recording medium can be suppressed, presumably leading to the improvement in bleeding and inter color bleeding properties.

Hereinafter, the ink set used for the ink jet recording method of the invention is described in detail.

The ink set used for the ink jet recording method of the invention at least contains a first liquid that at least contains a colorant, a water-soluble solvent and water, and a second liquid that at least contains a coagulating agent, a water-soluble solvent and water.

First Liquid

The first liquid of the invention at least includes a colorant, a water-based solvent and water. Details of each of the components are hereinafter explained.

Colorant

The colorant that is used in the first liquid may be either a dye or a pigment. However, a pigment is specifically preferable in the invention. The reason thereof is thought because a pigment does more easily generates aggregates than a dye does when it is mixed with the second liquid. Among various pigments, a pigment that is dispersed by using a polymer dispersing agent (a high-molecular substance, which is described below), a self-dispersible pigment, a resin-coated pigment, and a polymer graft pigment are preferably used.

Either an organic pigment or an inorganic pigment may be used in the invention. Examples of a black pigment include carbon black pigments such as a furnace black, lamp black, acetylene black and channel black. In addition to the black pigments and three primary colors of cyan, magenta, and yellow, other pigments such as specific color pigments of red, green, blue, brown, white, or the like, metal gloss pigments of gold color, silver color or the like, extender pigments of colorless or pale color, plastic pigments and the like may also be used. Further, particles which are formed by adhering dyes or pigments on surfaces of cores formed from silica, alumina, polymer bead or the like, insoluble lake dyes, colored emulsions, colored latexes or the like may also be used. Furthermore, pigments that are newly synthesized for the invention may also be used.

Specific examples of the black pigment used in the invention include RAVEN7000, RAVEN 5750, RAVEN 5250, RAVEN 5000, ULTRA II, RAVEN 3500, RAVEN 2000, RAVEN 1500, RAVEN 1250, RAVEN 1200, RAVEN 1190, ULTRA II, RAVEN 1170, RAVEN 1255, RAVEN 1080, and RAVEN 1060 (all trade names, manufactured by Colombian Carbon Co.), REGAL 400R, REGAL 330R, REGAL 660R, MOGUL® L, BLACK PEARLS L, MONARCH® 700, MONARCH® 800, MONARCH® 880, MONARCH® 900, MONARCH® 1000, MONARCH® 1100, MONARCH®1300, and MONARCH® 1400 (all trade names, manufactured by Cabot Corporation), COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, SPECIAL BLACK41400 (all trade names, manufactured by Degussa), NO. 25, NO. 33, NO. 40, NO. 47, NO. 52, NO. 900, NO. 2300, MCF-88, MA600, MA7, MA8, and MA100 (all trade names, manufactured by Mitsubishi Chemical Co.), however, the invention is not limited thereby.

Specific examples of the cyan pigment used in the invention include C. I. Pigment Blue-1, C. I. Pigment Blue-2, C. I. Pigment Blue-3, C. I. Pigment Blue-15, C. I. Pigment Blue-15:1, C. I. Pigment Blue-15:2, C. I. Pigment Blue-15:3, C. I. Pigment Blue-15:4, C. I. Pigment Blue-16, C. I. Pigment Blue-22, and C. I. Pigment Blue-60, however, the invention is not limited thereby.

Specific examples of the magenta pigment used in the invention include C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184, and C. I. Pigment Red-202, however, the invention is not limited thereby.

Specific examples of the yellow pigment used in the invention include C. I. Pigment Yellow-1, C. I. Pigment Yellow-2, C. I. Pigment Yellow-3, C. I. Pigment Yellow-12, C. I. Pigment Yellow-13, C. I. Pigment Yellow-14, C. I. Pigment Yellow-16, C. I. Pigment Yellow-17, C. I. Pigment Yellow-73, C. I. Pigment Yellow-74, C. I. Pigment Yellow-75, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-138, C. I. Pigment Yellow-151, C. I. Pigment Yellow-154, and C. I. Pigment Yellow-180, however, the invention is not limited thereby.

The pigment that is self-dispersible in water and is used in the invention means a pigment which has plurality of water-solubilizing groups on a surface of the pigment and stably dispersed in water without using a high molecular dispersing agent. Specifically, the pigment that is self-dispersible in water can be obtained by surface modifying treatment of conventionally-known pigments by such as an acid-base treatment, a coupling agent treatment, a polymer graft treatment, a plasma treatment or an oxidation-reduction treatment.

In addition to the pigment obtained by surface modifying treatment, that is self-dispersible in water, specific examples of the pigment that is self-dispersible in water include CAB-O-JET® 200, CAB-O-JET® 250, CAB-O-JET® 260, CAB-O-JET® 270, CAB-O-JET® 300, IJX-444, and IJX-55 (all trade names, manufactured by Cabot Corporation), MICROJET BLACK CW-1 and MICROJET BLACK CW-2 (both trade names, manufactured by Orient Chemical Industries, Ltd.).

The self-dispersible pigment which is used as a colorant of the first liquid preferably has a carboxylate group on the surface thereof. Since a carboxylate group has a low degree of dissociation, it is assumed that a pigment having a carboxylate group thereon has a sufficient coagulating ability.

When the colorant of the first liquid has a sulfonate group on the surface thereof, a high-molecular compound having a carboxylate group is preferably used in combination with such a colorant. Since the colorant having a sulfonate group hardly aggregate, optical density may not be improved and bleeding and intercolor bleeding may not be suppressed when such a colorant is used. When such a colorant is used in combination with the high-molecular compound having a carboxylate group, the high-molecular compound having a carboxylate group becomes insoluble at the time that the ink and the liquid composition are mixed. At this time, the colorant particles are surrounded by the high-molecular compound and aggregate, whereby optical density is improved, and bleeding and intercolor bleeding are suppressed.

A pigment which is coated with a resin may also be used as the colorant of the first liquid. This pigment is referred to as a microencapsulated pigment, and examples thereof include commercial microencapsulated pigments available from Dainippon Ink and Chemicals, Inc., or Toyo Ink Manufacturing Co., Ltd., and a microencapsulated pigments developed for tests for the invention.

Further, the pigment which is used as the colorant of the first liquid may be a polymer-grafted pigment. The polymer-grafted pigment is a pigment in which an organic compound such as a polymer chemically bonds to the surface of the pigment.

Examples of the dye that can be used in the invention include water-soluble dyes and dispersant dyes. Specific examples of the water-soluble dye include C. I. Direct Black-2, C. I. Direct Black-4, C. I. Direct Black-9, C. I. Direct Black-11, C. I. Direct Black-17, C. I. Direct Black-19, C. I. Direct Black-22, C. I. Direct Black-32, C. I. Direct Black-80, C. I. Direct Black-151, C. I. Direct Black-154, C. I. Direct Black-168, C. I. Direct Black-171, C. I. Direct Black-194, C. I. Direct Black-195, C. I. Direct Blue-1, C. I. Direct Blue-2, C. I. Direct Blue-6, C. I. Direct Blue-8, C. I. Direct Blue-22, C. I. Direct Blue-34, C. I. Direct Blue-70, C. I. Direct Blue-71, C. I. Direct Blue-76, C. I. Direct Blue-78, -86, C. I. Direct Blue-112, C. I. Direct Blue-142, C. I. Direct Blue-165, C. I. Direct Blue-199, C. I. Direct Blue-200, C. I. Direct Blue-201, C. I. Direct Blue-202, C. I. Direct Blue-203, C. I. Direct Blue-207, C. I. Direct Blue-218, C. I. Direct Blue-236, C. I. Direct Blue-287, C. I. Direct Blue-307, C. I. Direct Red-1, C. I. Direct Red-2, C. I. Direct Red-4, C. I. Direct Red-8, C. I. Direct Red-9, C. I. Direct Red-11, C. I. Direct Red-13, C. I. Direct Red-15, C. I. Direct Red-20, C. I. Direct Red-28, C. I. Direct Red-31, C. I. Direct Red-33, C. I. Direct Red-37, C. I. Direct Red-39, C. I. Direct Red-51, C. I. Direct Red-59, C. I. Direct Red-62, C. I. Direct Red-63, C. I. Direct Red-73, C. I. Direct Red-75, C. I. Direct Red-80, C. I. Direct Red-81, C. I. Direct Red-83, C. I. Direct Red-87, C. I. Direct Red-90, C. I. Direct Red-94, C. I. Direct Red-95, C. I. Direct Red-99, C. I. Direct Red-101, C. I. Direct Red-110, C. I. Direct Red-189, C. I. Direct Red-227, C. I. Direct Yellow-1, C. I. Direct Yellow-2, C. I. Direct Yellow-4, C. I. Direct Yellow-8, C. I. Direct Yellow-1, C. I. Direct Yellow-12, C. I. Direct Yellow-26, C. I. Direct Yellow-27, C. I. Direct Yellow-28, C. I. Direct Yellow-33, C. I. Direct Yellow-34, C. I. Direct Yellow-41, C. I. Direct Yellow-44, C. I. Direct Yellow-48, C. I. Direct Yellow-58, C. I. Direct Yellow-86, C. I. Direct Yellow-87, C. I. Direct Yellow-88, C. I. Direct Yellow-132, C. I. Direct Yellow-135, C. I. Direct Yellow-142, C. I. Direct Yellow-144, C. I. Direct Yellow-173, C. I. Food Black-1, C. I. Food Black-2, C. I. Acid Black-1, C. I. Acid Black-2, C. I. Acid Black-7, C. I. Acid Black-16, C. I. Acid Black-24, C. I. Acid Black-26, C. I. Acid Black-28, C. I. Acid Black-31, C. I. Acid Black-48, C. I. Acid Black-52, C. I. Acid Black-63, C. I. Acid Black-107, C. I. Acid Black-112, C. I. Acid Black-118, C. I. Acid Black-119, C. I. Acid Black-121, C. I. Acid Black-156, C. I. Acid Black-172, C. I. Acid Black-194, C. I. Acid Black-208, C. I. Acid Blue-1, C. I. Acid Blue-7, C. I. Acid Blue-9, C. I. Acid Blue-15, C. I. Acid Blue-22, C. I. Acid Blue-23, C. I. Acid Blue-27, C. I. Acid Blue-29, C. I. Acid Blue-40, C. I. Acid Blue-43, C. I. Acid Blue-55, C. I. Acid Blue-59, C. I. Acid Blue-62, C. I. Acid Blue-78, C. I. Acid Blue-80, C. I. Acid Blue-81, C. I. Acid Blue-83, C. I. Acid Blue-90, C. I. Acid Blue-102, C. I. Acid Blue-104, C. I. Acid Blue-111, C. I. Acid Blue-185, C. I. Acid Blue-249, C. I. Acid Blue-254, C. I. Acid Red-1, C. I. Acid Red-4, C. I. Acid Red-8, C. I. Acid Red-13, C. I. Acid Red-14, C. I. Acid Red-15, C. I. Acid Red-18, C. I. Acid Red-21, C. I. Acid Red-26, C. I. Acid Red-35, C. I. Acid Red-37, C. I. Acid Red-52, C. I. Acid Red-110, C. I. Acid Red-144, C. I. Acid Red-180, C. I. Acid Red-249, C. I. Acid Red-257, C. I. Acid Red-289, C. I. Acid Yellow-1, C. I. Acid Yellow-3, C. I. Acid Yellow-4, C. I. Acid Yellow-7, C. I. Acid Yellow-11, C. I. Acid Yellow-12, C. I. Acid Yellow-13, C. I. Acid Yellow-14, C. I. Acid Yellow-18, C. I. Acid Yellow-19, C. I. Acid Yellow-23, C. I. Acid Yellow-25, C. I. Acid Yellow-34, C. I. Acid Yellow-38, C. I. Acid Yellow-41, C. I. Acid Yellow-42, C. I. Acid Yellow-44, C. I. Acid Yellow-53, C. I. Acid Yellow-55, C. I. Acid Yellow-61, C. I. Acid Yellow-71, C. I. Acid Yellow-76, C. I. Acid Yellow-78, C. I. Acid Yellow-79, and C. I. Acid Yellow-122.

Specific examples of the dispersant dye include C. I Disperse Yellow-3, C. I Disperse Yellow-5, C. I Disperse Yellow-7, C. I Disperse Yellow-8, C. I Disperse Yellow-42, C. I Disperse Yellow-54, C. I Disperse Yellow-64, C. I Disperse Yellow-79, C. I Disperse Yellow-82, C. I Disperse Yellow-83, C. I Disperse Yellow-93, C. I Disperse Yellow-100, C. I Disperse Yellow-119, C. I Disperse Yellow-122, C. I Disperse Yellow-126, C. I Disperse Yellow-160, C. I Disperse Yellow-184:1, C. I Disperse Yellow-186, C. I Disperse Yellow-198, C. I Disperse Yellow-204, C. I Disperse Yellow-224, C. I. Disperse Orange-13, C. I. Disperse Orange-29, C. I. Disperse Orange-31:1, C. I. Disperse Orange-33, C. I. Disperse Orange-49, C. I. Disperse Orange-54, C. I. Disperse Orange-66, C. I. Disperse Orange-73, C. I. Disperse Orange-119, C. I. Disperse Orange-163, C. I. Disperse Red-1, C. I. Disperse Red-4, C. I. Disperse Red-11, C. I. Disperse Red-17, C. I. Disperse Red-19, C. I. Disperse Red-54, C. I. Disperse Red-60, C. I. Disperse Red-72, C. I. Disperse Red-73, C. I. Disperse Red-86, C. I. Disperse Red-92, C. I. Disperse Red-93, C. I. Disperse Red-126, C. I. Disperse Red-127, C. I. Disperse Red-135, C. I. Disperse Red-145, C. I. Disperse Red-154, C. I. Disperse Red-164, C. I. Disperse Red-167:1, C. I. Disperse Red-177, C. I. Disperse Red-181, C. I. Disperse Red-207, C. I. Disperse Red-239, C. I. Disperse Red-240, C. I. Disperse Red-258, C. I. Disperse Red-278, C. I. Disperse Red-283, C. I. Disperse Red-311, C. I. Disperse Red-343, C. I. Disperse Red-348, C. I. Disperse Red-356, C. I. Disperse Red-362, C. I. Disperse Violet-33, C. I. Disperse Blue-14, C. I. Disperse Blue-26, C. I. Disperse Blue-56, C. I. Disperse Blue-60, C. I. Disperse Blue-73, C. I. Disperse Blue-87, C. I. Disperse Blue-128, C. I. Disperse Blue-143, C. I. Disperse Blue-154, C. I. Disperse Blue-165, C. I. Disperse Blue-165:1, C. I. Disperse Blue-176, C. I. Disperse Blue-183, C. I. Disperse Blue-185, C. I. Disperse Blue-201, C. I. Disperse Blue-214, C. I. Disperse Blue-224, C. I. Disperse Blue-257, C. I. Disperse Blue-287, C. I. Disperse Blue-354, C. I. Disperse Blue-365, C. I. Disperse Blue-368, C. I. Disperse Green-6:1 and C. I. Disperse Green-9.

The colorant particles in the first liquid preferably have a volume average diameter of about 30 to about 250 nm. The volume average diameter means that of the colorant particles themselves. Alternatively, when an additive such as a dispersing agent bonds to the colorant, the volume average diameter means that of particles including the colorant and the additive. In the invention, the volume average diameter is measured by MICROTRAC UPA PARTICLE SIZE ANALYZER (trade name, manufactured by Leeds & Northrup Company). Specifically, the volume average diameter is measured according to a predetermined method in which a measurement cell containing 4 ml of the first liquid (ink) is used. As parameters to be input to the measuring device for measurement, the viscosity of the first liquid (ink) and the density of the colorant are input as viscosity, and density of dispersed particles.

The volume average diameter is more preferably about 50 to about 200 nm, and still more preferably about 75 to about 175 nm. When the volume average diameter of the colorant particles in the first liquid is less than 30 nm, optical density may lower. On the other hand, when the volume average diameter is more than 250 nm, storage stability of the first liquid may deteriorate.

The mass ratio of the colorant to the total mass of the first liquid is preferably about 0.1 to about 20% by mass, and more preferably about 1 to about 10% by mass. When the mass ratio is less than 0.1% by mass, optical density may be insufficient. On the other hand, the mass ratio is more than 20% by mass, an ejection property of the first liquid may become unstable.

High-molecular Substance

The first liquid preferably includes a high-molecular substance in order to disperse the colorant therein or in order to accelerate coagulation of the colorant. In the invention, the high-molecular substance used to disperse the colorant (pigment) is referred to as a high-molecular dispersing agent.

The high-molecular substance may be either a water-soluble high-molecular substance or a water-insoluble high-molecular substance such as an emulsion or self-dispersible fine particles, and may be a nonionic compound, an anionic compound, a cationic compound, or an amphoteric compound.

The high-molecular substance in the first liquid has a property of being increased in viscosity or being coagulated by the coagulating agent in the second liquid. The reason why the high-molecular substance accelerates the coagulation speed of the colorant is presumed as that the colorant is incorporated into the high-molecular substance during the coagulation. Accordingly, a size and a density of a structure at the time that the high-molecular substance is coagulated, and a degree of easiness at which the colorant is incorporated in the high-molecular substance, are important factors for accelerating the coagulation speed of the colorant. Optical density can be improved, and bleeding and intercolor bleeding can be suppressed by selecting the kinds of the colorant and the high-molecular substance contained in the first liquid, and the kind of the coagulating agent of the second liquid such that the above-described factors are optimized.

In the invention, the high-molecular substance is preferably a compound having a carboxylate group. It is presumed that The reason why such a compound is preferable is because a carboxylate group has a low degree of dissociation and may accelerate coagulation caused by the coagulating agent.

Hereinafter, specific examples of the high-molecular substance used in the invention is explained.

Specific examples of the high-molecular substance include a copolymer of monomers having $\alpha$, $\beta$-ethylenic unsaturated groups. Examples of the monomers having $\alpha$, $\beta$-ethylenic unsaturated groups include an acrylic acid, a methacrylic acid, a crotonic acid, an itaconic acid, an itaconic acid monoester, a maleic acid, a maleic acid monoester, a fumaric acid, a fumaric acid monoester, a vinyl sulfonic acid, a styrene sulfonic acid, a sulfonated vinylnaphthalene, a vinyl alcohol, an acrylamide, a methacrylamide, a methacryloxy ethylphosphate, a bis methacryloxy ethylphosphate, a methacryloxy ethylphenylacid phosphate, an ethyleneglycol dimethacrylate, a diethyleneglycol dimethacrylate, a styrene, a styrene derivative such as an $\alpha$-methylstyrene or a vinyltoluene, a vinylcyclohexane, a vinylnaphthalene, a vinylnaphthalene derivative, an alkyl acrylate ester, an phenyl acrylate ester, an alkyl methacrylate ester, a phenyl methacrylate ester, a cycloalkyl methacrylate ester, an alkyl crotonate ester, a dialkyl itaconate ester, and a dialkyl malate ester.

Copolymers which are obtained by copolymerizing monomers of single or plurality species of the above-described monomers having $\alpha$, $\beta$-ethylenic unsaturated groups are preferably used as the polymer of the invention. Specific examples of the polymer include a styrene-styrene sulfonic acid copolymer, a styrene-maleic acid copolymer, a styrene-methacryl acid copolymer, a styrene-acrylic acid copolymer, a vinylnaphtalene-maleic acid copolymer, a vinylnaphtalene-methacrylic acid copolymer, a vinylnaphtalene-acrylic acid copolymer, an alkyl acrylate ester-acrylic acid copolymer, an alkyl methacrylate ester-methacrylic acid copolymer, a styrene-alkyl methacrylate ester-methacrylic acid copolymer, a styrene-alkyl acrylate ester-acrylic acid copolymer, a styrene-phenyl methacrylate ester-methacrylic acid copolymer, and a styrene-cyclohexyl methacrylate ester-methacrylic acid copolymer.

The polymer is preferably selected on basis of an acid value and the like, and in view of a compatibility with colorants (pigments), coagulation ability of the polymer and the like. Specifically, the polymer preferably has an acid value of in a range of about 30 KOH mg/g or more to about 150 KOH mg/g, or the polymer preferably has an acid value of in a range of about 150 to 1,000 KOH mg/g and a neutralization degree of in a range of about 20 to 80%.

When the acid value of the polymer is in a range of about 30 KOH mg/g or more to about 150 KOH mg/g, the acid value is more preferably in a range of about 50 KOH to 120 KOH mg/g, and more preferably in a range of about 70 KOH to 120 KOH mg/g. If the acid value of the polymer is less than 30 KOH mg/g, an ejection stability of the first liquid of the invention may deteriorated.

On the other hand, when the polymer has an acid value of in a range of about 150 to 1,000 KOH mg/g and a neutralization degree of in a range of about 20 to 80%, the acid value is more preferably in a range of about 200 to 400 KOH mg/g and the neutralization degree is in a range of about 50 to 80%, and the acid value is further preferably in a range of about 200 to 300 KOH mg/g and the neutralization degree is in a range of about 60 to 80% If the acid value of the polymer is more than 1,000 KOH mg/g, a coagulation of the colorants may become insufficient, and a sufficient optical density and suppression of blurring may not observed. On the other hand, if the neutralization degree is less than 20%, a solubiliazability of the polymer may become insufficient, which may cause deterioration in reliability so as to cause nozzle cloggings or the like. Further, if the neutralization degree is more than 80%, a visocity of the ink may be increased, and the ink may not be properly ejected.

The advantages of use of a high-molecular substance having a low acid value, or a high acid value and a low neutralization degree is thought to be as follows. The number of water-soluble groups of the high-molecular substance can be reduced, and, even when a coagulating agent having weak cohesion is contained in the liquid composition, sufficient cohesion can be achieved.

The weight-average molecular weight of the high-molecular substance is preferably about 2,000 to about 15,000, and more preferably about 3,500 to about 10,000. When the weight-average molecular weight of the high-molecular substance is less than 2,000, the pigment may be unstably dispersed in the ink. On the other hand, when the weight-average molecular weight is more than 15,000, the viscosity of the ink becomes high and ejecting property of the ink deteriorates in some cases.

The mass ratio of the high-molecular substance, that is added to the first liquid, to the total mass of the first liquid is preferably about 0.01 to about 10% by mass, more preferably about 0.05 to about 7.5% by mass, and still more preferably about 0.1 to about 5% by mass. When the mass ratio is more than 10% by mass, a viscosity of the ink becomes high and ejecting property of the ink deteriorates in some cases. On the other hand, when the mass ratio is less than 0.01% by mass, dispersion stability of the pigment may lower.

Water-soluble Solvent

The water-soluble solvent for use in the ink may be any solvent as long as it has a solubility of about 0.1% or more in water. Specific examples of the water-soluble solvent include a polyhydric alcohol, a polyhydric alcohol derivative, a nitrogen-containing solvent, an alcohol, and a sulfur-containing solvent.

Specific examples of the polyhydric alcohol include ethylene glycol, diethylene glycol, propylene glycol, butylene glycol, triethylene glycol, 1,5-pentanediol, 1,2,6-hexanetriol, and glycerin.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide-adduct of diglycerin.

Specific examples of the nitrogen-containing solvent include pyrrolidone, N-methyl-2-pyrrolidone, cyclohexylpyrrolidone, and triethanolamine.

Specific examples of the alcohol include ethanol, isopropyl alcohol, butyl alcohol, and benzyl alcohol.

Specific examples of the sulfur-containing solvent include thiodiethanol, thiodiglycerol, sulfolane, and dimethyl sulfoxide.

Examples of the water-soluble solvent further include propylene carbonate, ethylene carbonate and the like may be used.

These water-soluble solvents may be used singly or in combination of two or more of them.

One of these water-soluble solvents may be used, or two or more of them may be used together.

The mass ratio of the water-soluble solvent to the total mass of the first liquid is preferably about 1 to about 60% by mass, and more preferably about 5 to about 40% by mass. When the mass ratio is less than 1% by mass, sufficient optical density may not be obtained. On the other hand, the mass ratio is more than 60% by mass, a viscosity of the liquid becomes high and ejecting stability thereof deteriorates in some cases.

Preferred Physical Properties of First Liquid

The surface tension of the first liquid is preferably in a range of about 20 to about 60 mN/m, more preferably about 20 to about 45 mN/m, and still more preferably about 25 to about 35 mN/m. When the surface tension is less than 20 mN/m, the liquid may leak from a nozzle and spread on a head nozzle surface and ejecting property of the ink deteriorates in some cases. On the other hand, when the surface tension is more than 60 mN/m, permeation of the ink into paper may require longer time, and drying time may lengthen.

Further, the viscosity of the first liquid is preferably about 1.2 to about 8.0 mPa·s, more preferably not less than about 1.5 mPa·s and less than about 6.0 mPa·s, and still more preferably not less than about 1.8 mPa·s and less than about 4.5 mPa·s. When the viscosity of the first liquid is higher than 8.0 mPa·s, ejecting property of the first liquid may deteriorate. On the other hand, the viscosity is lower than 1.2 mPa·s, ejecting stability of the first liquid may deteriorate at the time of continuous ejecting.

Water

The first liquid contains water such that the surface tension and the viscosity are within the above ranges. The mass ratio of the water to the total mass of the first liquid is not particularly limited, but is preferably about 10 to about 99% by mass, and more preferably about 30 to about 80% by mass.

Second Liquid

The second liquid of the invention at least contains a coagulating agent, a water-soluble solvent, and water.

Hereinafter, details of each of the components will be described.

Coagulating Agent

The coagulating agent used in the invention is a substance that reacts or interacts with a component or components of the first liquid to cause increasing of viscosity or coagulating of component(s) in the ink. Specific examples of the coagulating agent that is effective as such a substance include an inorganic electrolyte, an organic amine compound and an organic acid.

The inorganic electrolyte may be a salt of a metal ion and an acid. Examples of the metal ion include alkaline metal ions such as a lithium ion, a sodium ion, or a potassium ion; and polyvalent metal ions such as an aluminum ion, a barium ion, a calcium ion, a copper ion, an iron ion, a magnesium ion, a manganese ion, a nickel ion, a tin ion, a titanium ion, or a zinc ion. Examples of the acid include a hydrochloric acid, hydrobromic acid, hydroiodic acid, sulfuric acid, nitric acid, phosphoric acid, thiocyanic acid, organic carboxylic acids such as an acetic acid, oxalic acid, lactic acid, fumaric acid, citric acid, salicylic acid, or benzoic acid, and organic sulfonic acids.

Specific examples of the inorganic electrolyte include alkaline metal salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate, or potassium benzoate; and polyvalent metal salts such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, or zinc acetate.

The organic amine compound may be a primary, secondary, tertiary, or quaternary amine, or a salt thereof.

Specific examples of the organic amine compound include tetraalkylammonium salts, alkylamine salts, benzalconium salts, alkylpyridium salts, imidazolium salts, and polyamine salts, such as isopropylamine, isobutylamine, t-butylamine, 2-ethylhexylamine, nonylamine, dipropylamine, diethylamine, trimethylamine, triethylamine, dimethylpropylamine, ethylenediamine, propylenediamine, hexamethylenediamine, diethylenetriamine, tetraethylenepentamine, diethanolamine, diethylethanolamine, triethanolamine, tetramethylammonium chloride, tetraethylammonium bromide, dihydroxyethylstearylamine, 2-heptadecenyl-hydroxyethylimidazoline, lauryl dimethyl benzyl ammonium chloride, cetylpyridinium chloride, stearamidemethylpyridium chloride, diallyl dimethyl ammonium chloride polymers, diallylamine polymers, monoallylamine polymers, onium salts thereof including sulfonium salts and phosphonium salts thereof, or phosphate esters thereof.

Specific examples of the organic acid include a 2-pyrrolidone-5-carboxylic acid, 4-methyl-4-pentanolide-3-carboxilic acid, francarboxylic acid, 2-benzofrancarboxylic acid, 5-methyl-2 -francarboxylic acid, 2,5-dimethyl-3-francarboxylic acid, 2,5-frandicarboxylic acid, 4-butanolide-3-carboxylic acid, 3-hydroxy-4-pyrone-2,6-dicarboxylic acid, 2-pyrone-6-dicarboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionc acid, 3-hydroxy-2-indol carboxylic acid, 2,5-dioxo-4-methyl-3-pyrroline-3-propionc acid, 2-pyrrolidine carboxylic acid, 4-hydroxyproline, 1-methylpyrrolidine-2-carboxylic acid, 5-carboxy-1-methylpyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acidm, 1,2,5,6-tetrahydro-1-methylnicotinic acid, 2-quinoline carboxylic acid, 4-quinoline carboxylic acid, 2-phenyl-4-quinoline carboxylic acid, 4-hydroxy-2-quinoline carboxylic acid, 6-methoxy-4-quinoline carboxylic acid, potassium hydrogen phthalate, potassium dihydrogen phosphate, boric acid, sodium citrate, potassium citrate, sodium tetrahydroborate, tartaric acid, lactic acid, ammonium chloride, sodium hydroxide, potassium hydroxide, hydrochloric acid, derivatives and salts thereof.

Preferable examples of the coagulating agent includes a magnesium chloride, magnesium bromide, magnesium iodide, magnesium sulfate, magnesium nitrate, magnesium acetate, calcium chloride, calcium bromide, calcium nitrate, calcium dihydrogen phosphate, calcium benzoate, calcium acetate, calcium tartrate, calcium lactate, calcium fumarate, calcium citrate, diallyl dimethyl ammonium chloride polymers, diallylamine polymers, monoallylamine polymers, pyrrolidone carboxylic acid, pyrone carboxylic acid, pyrrole carboxylic acid, francarboxylic acid, pyridinecarboxylic acid, coumaric acid, thiophene carboxylic acid, nicotinic acid, potassium dihydrogen citrate, succinic acid, tartaric acid, lactic acid, potassium hydrogen phthalate, derivatives and salts thereof. Further preferable examples of the coagulating agent includes a magnesium chloride, magnesium nitrate, calcium nitrate, diallylamine polymers, pyrrolidone carboxylic acid, pyrone carboxylic acid, francarboxylic acid, coumaric acid, derivatives and salts thereof.

In the invention, the coagulating agent may be used singly or in combination of two or more thereof.

The mass ratio of an added amount of the coagulating agent(s) relative to the total mass of the second liquid is preferably about 0.01 to about 30% by mass, more preferably about 0.1 to about 15% by mass, and still more preferably about 0.25 to about 10% by mass. When the mass ratio is less than 0.01% by mass, coagulation of colorants may become insufficient at the time that the second liquid is in contact with the first liquid, thereby causing deterioration in optical density, bleeding, and intercolor bleeding. On the other hand, when the mass ratio is more than 30% by mass, ejecting property of the liquid may deteriorate and the liquid composition cannot be normally ejected out in some cases.

Water-soluble Solvent

The second liquid may contain a water-soluble solvent, which may be similar to that of the first liquid.

The mass ratio of the water-soluble solvent to the total mass of the second liquid is preferably about 1 to about 60% by mass, and more preferably about 5 to about 40% by mass. When the mass ratio is less than 1% by mass, sufficient optical density may not be obtained. On the other hand, when the mass ratio is more than 60% by mass, a viscosity of the liquid becomes high and ejecting property of the liquid may become unstable.

Preferable Physical Properties of Second Liquid

The surface tension of the second liquid is preferably about 20 to about 45 mN/m, more preferably about 20 to about 39 mN/m, and still more preferably about 25 to about 35 mN/m. When the surface tension is less than 20 mN/m, the liquid leaks from a nozzle and spreads on a head nozzle surface and ejecting property of the ink deteriorates in some cases. On the other hand, when the surface tension is more than 45 mN/m, penetration of the ink into paper may deteriorate, and drying time may lengthen.

The viscosity of the second liquid is preferably about 1.2 to about 8.0 mPa·s, more preferably at least 1.5 mPa·s and less than 6.0 mPa·s, and still more preferably at least 1.8 mPa·s and less than 4.5 mPa·s. When the viscosity of the liquid composition is higher than 8.0 mPa·s, ejecting property of the liquid may deteriorate. On the other hand, when the viscosity is less than 1.2 mPa·s, ejecting stability of the liquid may deteriorate at the time of continuous ejecting.

Water

The second liquid may contain water such that the surface tension and the viscosity are within the above-described ranges. The mass ratio of water to the total mass of the liquid composition is not particularly limited, however, it is preferably about 10 to about 99% by mass, and more preferably about 30 to about 80% by mass.

Colorant

The second liquid may further contain a colorant, if necessary. The colorant in the second liquid may be selected from those described in the above descriptions for the colorant of the first liquid. Preferable examples of the colorant of the second liquid is preferably a dye, a pigment having a sulfonic acid group or a sulfonate group on the surface thereof, an anionic self-dispersible pigment, and a cationic self-dispersible pigment. These colorant are thought to be preferable because they are hard to coagulate under an acidic condition and can improve storage stability of the second liquid.

Other Additives which can be Added to First Liquid and Second Liquid

Additives which can be contained in the first liquid and the second liquid will be described below.

A surfactant may be contained in the first liquid and the second liquid. Examples of the surfactant that can effectively used in the invention include compounds having a hydrophilic moiety and a hydrophobic moiety within the molecule thereof. The surfactant may be any of an anionic surfactant, a cationic surfactant, an ampholytic surfactant, and a nonionic surfactant. Further, the above-described high-molecular substance (the high-molecular dispersing agent) may be used as the surfactant.

Examples of the anionic surfactant include alkylbenzene sulfonates, alkylphenyl sulfonates, alkylnaphthalene sulfonates, higher fatty acid salts, sulfates of higher fatty acid esters, sulfonates of higher fatty acid esters, sulfates and sulfonates of higher alcohol ethers, higher alkylsulfosuccinates, higher alkylphosphates, and phosphates of adducts of higher alcohol and ethylene oxide. Specific examples of effective anionic surfactants include dodecylbenzene sulfonate, kerylbenzene sulfonate, isopropylnaphthalene sulfonate, monobutylphenylphenol monosulfonate, monobutylbiphenyl sulfonate, and dibutylphenylphenol disulfonate.

Specific examples of the nonionic surfactant include polypropylene glycol-ethylene oxide adducts, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, acetylene glycol-oxyethylene adducts, aliphatic alkanolamides, glycerin esters, and sorbitan esters.

Examples of the cationic surfactant include tetraalkylammonium salts, alkylamine salts, benzalconium salts, alkylpyridium salts, and imidazolium salts. Specific examples thereof include dihydroxyethylstearylamine, 2-heptadecenyl-hydroxyethylimidazoline, lauryl dimethyl benzyl ammonium chloride, cetylpyridinium chloride, and stearamidemethylpyridium chloride.

Further, spiclisporic acid, and/or biosurfactants such as rhamnolipid or rhizolecithin may also be used as the surfactant in the invention.

The content (mass ratio) of the surfactant in each of the first liquid and the second liquid is preferably less than 10% by mass, more preferably about 0.01 to about 5% by mass, and still more preferably about 0.01 to about 3% by mass relative to the total mass of the first liquid or the second liquid. When the surfactant content is 10% by mass or more, optical density and storage stability of a pigment ink may deteriorate.

Further, in view of controlling (improving) properties of the ink such as ejecting property, the first liquid and the second liquid may further contain polyethyleneimine, polyamine, polyvinylpyrrolidone, polyethylene glycol, a cellulose derivative such as ethylcellulose or carboxymethylcellulose, a polysaccharide and derivatives thereof, water-soluble polymers, polymer emulsions such as an acrylic polymer emulsion, a polyurethane emulsion or a hydrophilic latex, hydrophilic polymer gels, a cyclodextrin, a macrocyclic amine, a dendrimer, a crown ether, urea or a derivative thereof, acetamide, a silicone surfactant, and/or a fluorinated surfactant.

Further, in view of controlling conductivities and pH values, the first liquid and the second liquid may further contain an alkaline metal compound such as potassium hydroxide, sodium hydroxide or lithium hydroxide, a nitrogen-containing compound such as ammonium hydroxide, triethanolamine, diethanolamine, ethanolamine or 2-amino-2-methyl-1-propanol, an alkaline earth metal compound such as calcium hydroxide, an acid such as sulfuric acid, hydrochloric acid or nitric acid, and/or a salt of a strong acid and a weak alkali such as ammonium sulfate.

Furthermore, the first liquid and the second liquid may further contain a pH buffer, an antioxidant, a fungicide, a viscosity-controlling agent, an electrically conducting agent, and/or an ultraviolet absorbent, if necessary.

The first liquid and the second liquid used in the invention can be used in not only an ordinary ink jet recording apparatus, but also a recording apparatus equipped with a heater for controlling drying property of an ink, or a recording apparatus equipped with an intermediate transfer unit for transferring a recording material printed on an intermediate member onto a recording medium such as paper. Further, the second liquid can be applied by a unit other than ink jet systems, such as a liquid application roller.

Ink Jet Recording Apparatus

The ink jet recording apparatus according to the invention has a recording head for ejecting an ink set for ink jet recording onto a recording medium, the ink set containing a first liquid, which at least contains a colorant, a water-soluble solvent and water, and a second liquid, which at least contains a coagulating agent, a water-soluble solvent and water.

In the ink jet recording apparatus of the present invention, both a double sided print mode and a single sided print mode are used. The application amount per unit area of the first liquid in double sided printing mode $RD_1$, and the application amount per unit area of the second liquid in double sided printing mode $RD_2$, application amount per unit area of the first liquid in single sided printing mode $RM_1$ and the application amount per unit area of the second liquid in single sided printing mode $RM_2$, satisfy the relationship shown in Expression (1) below.

$$0.01 < \frac{RD_2 \times RM_1}{RD_1 \times RM_2} < 1 \quad \text{Expression (1)}$$

In the ink jet recording apparatus of the invention, the preferable value for $[(RD_2 \times RM_1)/(RD_1 \times RM_2)]$ is 0.1 or more but less than 1, and more preferably it is 0.5 or more but less than 0.9.

When the value of $[(RD_2 \times RM_1)/(RD_1 \times RM_2)]$ is more than 1, the drying speed of the colorant is slow, and dirty images occur. However, if $[(RD_2 \times RM_1)/(RD_1 \times RM_2)]$ is less than 0.01 then there occurs the problem that sufficient optical density is not obtainable.

The following methods are examples of ways of satisfying the above Expression (1): a) adjusting the number of pixels applied of the first liquid and/or the second liquid; b) adjusting the amount of the first liquid applied per pixel and/or the amount of the second liquid applied per pixel. In the method b) it is preferable that adjusting the amount of the first liquid applied per pixel and/or the amount of the second liquid applied per pixel is carried out by altering the wave pattern of the applied voltage to the liquids as they are discharged.

Also, in both methods a) and b) it is preferable that the amount of the second liquid applied per unit area $RD_2$ during double sided printing is appropriately reduced.

In the ink jet recording apparatus of the invention, for printing with the same color, it is preferable that the application amount per unit area of the first liquid in double sided printing mode $RD_1$, and the application amount per unit area of the first liquid in single sided printing mode $RM_1$ satisfy the relationship shown in Expression (2) below.

$$0.01 < RD_1/RM_1 < 1 \quad \text{Expression (2)}$$

The preferable value for $(RD_1/RM_1)$ in the ink jet recording apparatus of the present invention is 0.1 or over but less than 1, and more preferably it is 0.5 or over but less than 9.

When the value of $(RD_1/RM_1)$ is more than 1, the drying speed of the colorant is slow, and such problems as dirty images, curling and cockling can occur. However, if $(RD_1/RM_1)$ is less than 0.01 then there is the problem that sufficient optical density is not obtainable.

The following methods are examples of ways of satisfying the above Expression (2): a') adjusting the number of pixels applied of the first liquid in the double and/or single sided print modes; b') adjusting the amount of the first liquid applied per pixel in the double and/or single sided print modes. In the method b') it is preferable that adjusting the amount of the first liquid applied per pixel is carried out by altering the wave pattern of the applied voltage to the liquids as they are discharged.

Also, in both methods a') and b') it is preferable that the amount of the first liquid applied per unit area $RD_1$ is appropriately reduced in the double sided print mode.

Preferred embodiments of the ink jet recording apparatus of the invention (hereinafter simply referred as a "recording apparatus" in some cases) will be described in detail below with reference to drawings, which are not intended to restrict the invention.

Figure 2:
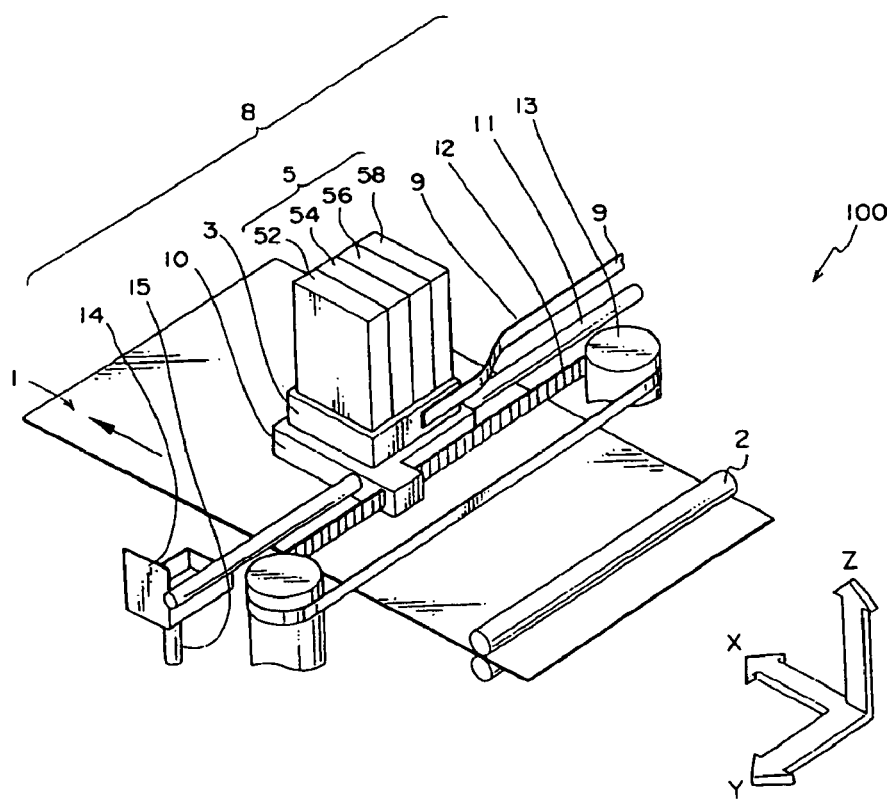
FIG. 2 A perspective view showing a basic internal structure of the ink jet recording apparatus of FIG. 1.

FIG. 1 is a perspective view showing the appearance of an ink jet recording apparatus according to a preferred embodiment of the invention. FIG. 2 is a perspective view showing the basic internal structure of the ink jet recording apparatus of FIG. 1.

The recording apparatus 100 of this embodiment is driven and forms (or prints) an image according to the ink jet recording method of the invention.

As shown in FIGS. 1 and 2, the recording apparatus 100 has, as main components thereof, an external cover 6, a tray 7 on which a certain number of recording media 1 such as plain paper can be placed, feeding rollers (feed unit) 2 for feeding the recording media 1 into the inside of the recording apparatus 100 one by one, and an image forming unit 8 for ejecting the first liquid (ink) and the second liquid (liquid composition) onto a recording medium 1 to form an image.

The feeding rollers 2 are a pair of rollers rotatably disposed in the recording apparatus 100. The feeding rollers 2 sandwich a recording medium 1 placed on the tray 7, and feed the recording medium 1 into the inside of the recording apparatus 100 one by one at a predetermined timing.

The image forming unit 8 ejects the first liquid and the second liquid onto the recording medium 1 to form an image. The image forming unit 8 mainly has a recording head 3, an ink tank 5, an electrical signal feeding cable 9, a carriage 10, a guide rod 11, a timing belt 12, driving pulleys 13, and a maintenance unit 14.

In this embodiment, the ink tank 5 has plural tanks 52, 54, 56 and 58, in which the first liquid(s) of different colors and the second liquid are stored ejectably.

Further, as shown in FIG. 2, the recording head 3 is electrically connected to the electrical signal feeding cable 9 and communicates with the ink tank 5. When printing information (image recording information) is input from the outside to the recording head 3 through the electrical signal feeding cable 9, the recording head 3 sucks predetermined amounts of the inks from the ink tanks 51 to 55 on the basis of the information, and ejects the inks onto a recording medium. The electrical signal feeding cable 9 supplies not only the printing information, but also electric power for driving to the recording head 3.

The recording head 3 is disposed and fixed on the carriage 10, and the carriage 10 is connected to the guide rod 11 and the timing belt 12 wound around the driving pulleys 13. Thus, the recording head 3 can be moved parallel to the recording medium 1 along the guide rod 11 in the direction Y (main scanning direction) perpendicular to the recording medium feeding direction X (sub scanning direction).

The recording apparatus 100 is equipped with a control device (not shown) for controlling driving timing of the recording head 3 and that of the carriage 10 on the basis of the image recording information. Thereby, an image corresponding to the image recording information can be continuously formed on a predetermined region of a recording medium 1 fed in the feeding direction X at a predetermined speed.

The maintenance unit 14 is connected to a decompression device via a tube 15 The maintenance unit 14 is further connected to nozzles of the recording head 3. The internal pressure of each of the nozzles is reduced by a vacuum pump 16 or the like disposed in a connection portion, whereby an ink is aspirated from each of the nozzles.

By using the maintenance unit 14, an obstructive ink adhered to the nozzles can be removed at the time that the recording apparatus 100 is being driven, and vaporization of the ink from the nozzles can be prevented at the time that the recording apparatus 100 is being stopped, if necessary. Since the coagulate is formed at the time that the first liquid and the second liquid is mixed, the maintenance unit 14 preferably has a structure in which the first liquid and the second liquid are separately stored so as to prevent an occurrence of such coagulation.

In the invention, the recording head 3 preferably implements a head for thermal ink jet recording method or a head for a piezo ink jet recording method.

The recording head 3 can adjust the application amount of the first liquid and/or the second liquid per pixel. In the invention, the application amount of each of the first liquid and the second liquid is preferably in a range of about 0.01 to 25 ng per pixel. The application amount of the first liquid per pixel is more preferably about 0.1 to 20 ng, and still more preferably about 0.5 to about 8 ng. The application amount of the second liquid per pixel is more preferably about 0.1 to 15 ng, and still more preferably about 0.5 to about 4 ng.

Since the preferable ranges of the application amounts of the first liquid and the second liquid per pixel are as described above, the amount of one drop of each of the first liquid and the second liquid ejected from the recording head 3 is preferably 25 ng or less.

The invention is applicable to an ink jet recording apparatus where a nozzle of the recording head can spray drops of multiple volumes, and the above amount per drop (mass) refers to the smallest drop sized achievable for printing in such an apparatus.

Further, it is preferable that, in a single-sided printing mode, the recording head 3 can adjust a mass ratio of application amount per pixel of the first liquid to that of the second liquid to a range from about 100:5 to 100:100, more preferably 100:5 to 100:50, and still more preferably 100:10 to 100:20.

Further, it is preferable that, in a double-sided printing mode, the recording head 3 can adjust a mass ratio of application amount per pixel of the first liquid to that of the second liquid to a range from about 100:1 to 100:50, more preferably 100:1 to 100:25, and still more preferably 100:2 to 100:15.

Examples of the recording medium, onto which the first liquid and the second liquid are ejected in the invention, include plain paper, as well as ink jet plain paper, coated paper, gloss paper, and film for ink jet printing. Coagulating property and permeability on a recording medium depend on the kinds of the recording medium, whereby it is preferable that the application amount of each of the first liquid and the second liquid is appropriately selected according to the kinds of the recording medium.

Hereinafter, particularly preferable embodiments of the invention will be listed, but it should be understood that the invention is not restricted to the following embodiments.

(1) An ink jet recording method which prints out by ejecting onto a recording medium an ink set for ink jet use, in which:

the ink set includes at least a first liquid including at least a colorant, a water soluble solvent and water; and a second liquid including at least a coagulating agent, a water soluble solvent and water;

recording in a double sided print mode and recording in a single sided print mode are possible;

and the relationship of the following Expression (1) is satisfied:

$$0.01 < \frac{RD_2 \times RM_1}{RD_1 \times RM_2} < 1 \quad \text{Expression (1)}$$

In the Expression (1), $RD_1$ is an application amount per unit area of the first liquid in double sided printing mode; $RD_2$ is an application amount per unit area of the second liquid in double sided printing mode; $RM_1$ is an application amount per unit area of the first liquid in single sided printing mode; and $RM_2$ is an application amount per unit area of the second liquid in single sided printing mode.

(2) The ink jet recording method of (1), in which, for recording by printing of the same color, the relationship of the following expression is satisfied:

$$0.01 < RD_1/RM_1 < 1 \quad \text{Expression (2).}$$

(3) The ink jet recording method of (1) or (2), wherein control so that Expression (1) is satisfied includes adjusting at least one of the group consisting of a number of pixels applied by the first liquid and a number of pixels applied by the second liquid.

(4) The ink jet recording method of any one of (1) to (3), wherein control so that Expression (1) is satisfied includes adjusting at least one of the group consisting of an amount of the first liquid applied per pixel and of an amount of the second liquid applied per pixel.

(5) The ink jet recording method of (4), wherein the adjusting at least one of the group consisting of the amount of the first liquid applied per pixel and of the amount of the second liquid applied per pixel includes changing the amount of the liquid, the amount of which is adjusted, by altering a wave form of a voltage applied to the liquid, the amount of which is adjusted.

(6) The ink jet recording method of any one of (1) to (5), wherein the amounts of the first liquid and the second liquid applied per pixel are each in a range of about 0.01 to 25 ng.

(7) The ink jet recording method of any one of (1) to (6), wherein, in the single sided printing mode, the ratio by mass of the amount of the first liquid per pixel to the second liquid applied per pixel is in a range of about 100:5 to 100:100; and, in the double sided printing mode, the ratio by mass of the amount of the first liquid per pixel to the second liquid applied per pixel is in a range of about 100:1 to 100:50.

(8) The ink jet recording method of any one of (1) to (7), wherein the first liquid includes a high-molecular substance.

(9) The ink jet recording method of (8), wherein an acid value of the high-molecular substance is in a range of about 30 to 150 KOH mg/g.

(10) The ink jet recording method of (8), wherein the acid value of the high-molecular substance is in a range of about 150 to 1000 KOH mg/g, and a degree of neutralization of the high-molecular substance is 20% to 80%.

(11) The ink jet recording method of any one of (8) to (10), wherein a weight-average molecular weight of the high-molecular substance is in a range of about 2,000 to 1,000,000.

(12) The ink jet recording method of any one of (1) to (11), wherein the coagulating agent is at least one selected from the group consisting of an inorganic electrolyte, an organic amine compound, and an organic acid.

(13) The ink jet recording method of any one of (1) to (12), wherein the colorant is a pigment, and the pigment is at least one selected from the group consisting of a pigment that is dispersed by using a polymer dispersing agent, a self-dispersible pigment dispersible in water, a resin-coated pigment, and a polymer graft pigment.

(14) The ink jet recording method of any one of (1) to (13), wherein a volume average particle diameter of the colorant is in a range of about 30 to 250 nm.

(15) The ink jet recording method of any one of (1) to (12), wherein the colorant is a dye.

(16) The ink jet recording method of any one of (1) to (15), wherein the second liquid includes a colorant.

(17) The ink jet recording method of any one of (1) to (16), wherein a surface tension of the first liquid is in a range of about 20 to 60 mN/m.

(18) The ink jet recording method of any one of (1) to (16), wherein a surface tensions of the second liquid is in a range of about 20 to 45 mN/m.

(19) The ink jet recording method of any one of (1) to (18), wherein a viscosity of the first liquid and a viscosity of the second liquid are each in a range of about 1.2 to 8.0 mPa·s.

(20) The ink jet recording method of any one of (1) to (19), wherein a number of coarse particles having a diameter of 5 μm or more formed in a mixture liquid of the first liquid and the second liquid is in a range of about 500 to 1,000,000 per μl of the mixture liquid.

(21) An ink jet recording apparatus which is provided with a recording head which ejects onto a recording medium an ink set for ink jet use, in which:

the ink set includes at least a first liquid including at least a colorant, a water soluble solvent and water; and a second liquid including at least a coagulating agent, a water soluble solvent and water;

recording in a double sided print mode and recording in a single sided print mode are possible;

and the relationship of the following Expression (1) is satisfied:

$$0.01 < \frac{RD_2 \times RM_1}{RD_1 \times RM_2} < 1 \quad \text{Expression (1)}$$

In the Expression (1), $RD_1$ is an application amount per unit area of the first liquid in double sided printing mode; $RD_2$ is an application amount per unit area of the second liquid in double sided printing mode; $RM_1$ is an application amount per unit area of the first liquid in single sided printing mode; and $RM_2$ is an application amount per unit area of the second liquid in single sided printing mode.

(22) The ink jet recording apparatus of (21), wherein, for recording by printing of the same color, the relationship of the following expression is satisfied:

$$0.01 < RD_1/RM_1 < 1 \quad \text{Expression (2).}$$

(23) The ink jet recording apparatus of (21) or (22), wherein a device which conducts control so that Expression (1) is satisfied by adjusting at least one of the group consisting of a number of pixels applied by the first liquid and a number of pixels applied by the second liquid is further provided therewith.

(24) The ink jet recording apparatus of any one of (21) to (23), wherein a device which conducts control so that Expression (1) is satisfied by adjusting at least one of the group consisting of an amount of the first liquid applied per pixel and of an amount of the second liquid applied per pixel is further provided therewith.

(25) The ink jet recording apparatus of any one of (21) to (24), wherein a device which conducts the adjusting at least one of the group consisting of the amount of the first liquid applied per pixel and of the amount of the second liquid applied per pixel by changing the amount of the liquid, the amount of which is adjusted, by altering a wave form of a voltage applied to the liquid, the amount of which is adjusted is further provided therewith.

(26) The ink jet recording apparatus of any one of (21) to (25), wherein the amounts of the first liquid and the second liquid applied per pixel are each in a range of about 0.01 to 25 ng.

(27) The ink jet recording apparatus of any one of (21) to (26), wherein, in the single sided printing mode, the ratio by mass of the amount of the first liquid per pixel to the second liquid applied per pixel is in a range of about 100:5 to 100:100; and, in the double sided printing mode, the ratio by mass of the amount of the first liquid per pixel to the second liquid applied per pixel is in a range of about 100:1 to 100:50.

EXAMPLES

Examples of the present invention will be described below, but is not intended to restrict the invention.

Pigment Modification Method 1

Six parts by mass of a salt in which a styrene-methacrylic acid copolymer has been neutralized with an alkali metal is added to 30 parts by mass of carbon black (MOGUL® L, manufactured by Cabot Corporation). Deionized water is added to the resultant mixture so that the total amount of the resultant becomes 300 parts by mass. Ultrasonic wave is applied to the resultant liquid with an ultrasonic homogenizer to disperse the pigment in a liquid. Then, the resultant dispersion liquid is centrifuged with a centrifugal separator and 100 parts by mass of the obtained residue is removed.

Pigment Modification Method 2

100 g of a pigment is added to an aqueous sulfanilic acid solution which is heated and is being stirred. The mixture, which is being stirred, is cooled to room temperature, and 14 g of a concentrated nitric acid is dripped into the mixture. Ten g of an aqueous NaNO$_2$ solution is added to the mixture. The resultant liquid is stirred until the reaction is completed. The obtained pigment is desalted. Deionized water is added to the surface-treated pigment such that the pigment content becomes 12% by mass. Then, the pH value of the mixture is adjusted to 7.5, and the mixture is stirred with an ultrasonic homogenizer. The resultant dispersion liquid is centrifuged at 8,000 rpm for 30 minutes with a centrifugal separator and the resultant residue, the ratio of which to the total amount is 20%, is removed.

Preparation of Liquids

Colorant solutions, water-soluble solvents, surfactants, ion-exchanged water and the like are mixed with each other to obtain a predetermined composition, and the mixed liquid is stirred. Thus obtained liquid is filtered with a filter having a pore size of 5 μm to obtain desired liquids.

Liquid A: First Liquid

| | |
|---|---|
| CAB-O-JET ® 300 (self-dispersible pigment having carboxylic acid groups: manufactured by Cabot Corporation) | 4% by mass |
| Styrene-acrylic acid copolymer having an acid value of 100 and a degree of neutralization of 95% | 0.5% by mass |
| Diethylene glycol | 25% by mass |
| Ethylene oxide adduct of acetylene glycol | 0.2% by mass |
| Deionized water | Remaining portion |

Liquid A has a pH value of 7.4, a surface tension of 31 mN/m, and a viscosity of 3.2 mPa·s.

Liquid B: Second Liquid

| | |
|---|---|
| CAB-O-JET ® 200 (self-dispersible pigment having sulfonic acid groups: manufactured by Cabot Corporation) | 4% by mass |
| Styrene-methacrylic acid copolymer having an acid value of 120 and a degree of neutralization of 90% | 0.7% by mass |
| Diethylene glycol | 20% by mass |
| Ethylene oxide adduct of acetylene glycol | 0.5% by mass |
| Deionized water | Remaining portion |

Liquid B has a pH value of 8.0, a surface tension of 31 mN/m, and a viscosity of 3.4 mPa·s.

Liquid C: First liquid

Liquid C is prepared in the predetermined manner by using the pigment modified in accordance with the pigment modification method 1.

| | |
|---|---|
| MOGUL ® L (pigment as described above, having no surface group) | 4% by mass |
| Styrene-methacrylic acid copolymer having an acid value of 250 and a degree of neutralization of 80% | 0.7% by mass |
| Diethylene glycol | 20% by mass |
| Ethylene oxide adduct of diglycerin | 5% by mass |
| Polyoxyethylene-2-ethylhexylether | 0.5% by mass |
| Deionized water | Remaining portion |

Liquid C has a pH value of 8.1, a surface tension of 34 mN/m, and a viscosity of 2.9 mPa·s.

Liquid D: First Liquid

Liquid D is prepared in the predetermined manner by using the pigment modified in accordance with the pigment modification method 2.

| | |
|---|---|
| C.I. Pigment Blue 15:3 (pigment having sulfonic acid groups) | 4% by mass |
| Styrene-acrylic acid copolymer having an acid value of 100 and a degree of neutralization of 95% | 0.6% by mass |
| Diethylene glycol | 20% by mass |
| Propylene glycol | 5% by mass |
| Ethylene oxide adduct of acetylene glycol | 1% by mass |
| Deionized water | Remaining portion |

Liquid D has a pH value of 7.4, a surface tension of 32 mN/m, and a viscosity of 3.1 mPa·s.

Liquid E: First Liquid

Liquid E is prepared in the predetermined manner by using the pigment modified in accordance with the pigment modification method 2.

| | |
|---|---|
| C.I. Pigment Red 122 (pigment having sulfonic acid groups) | 4% by mass |
| Styrene-acrylic acid copolymer having an acid value of 100 and a degree of neutralization of 95% | 0.6% by mass |
| Diethylene glycol | 20% by mass |
| Triethylene glycol | 5% by mass |
| Ethylene oxide adduct of acetylene glycol | 1% by mass |
| Deionized water | Remaining portion |

Liquid E has a pH value of 7.6, a surface tension of 32 mN/m, and a viscosity of 3.2 mPa·s.

Liquid F: First Liquid

Liquid F is prepared in the predetermined manner by using the pigment modified in accordance with the pigment modification method 2.

| | |
|---|---|
| C.I. Pigment Yellow 128 (pigment having sulfonic acid groups) | 4% by mass |
| Styrene-acrylic acid copolymer having an acid value of 100 and a degree of neutralization of 95% | 0.6% by mass |
| Diethylene glycol | 20% by mass |
| 2-Pyrrolidone | 5% by mass |
| Ethylene oxide adduct of acetylene glycol | 1% by mass |
| Deionized water | Remaining portion |

Liquid F has a pH value of 7.8, a surface tension of 32 mN/m, and a viscosity of 2.9 mPa·s.

Liquid G: Second Liquid

| | |
|---|---|
| Diethylene glycol | 30% by mass |
| Magnesium nitrate·6H$_2$O | 7.5% by mass |
| Ethylene oxide adduct of acetylene glycol | 1% by mass |
| Deionized water | Remaining portion |

Liquid G has a pH value of 5.6, a surface tension of 31 mN/m, and a viscosity of 2.9 mPa·s.

Liquid H: Second Liquid

| | |
|---|---|
| C.I. Acid Blue 9 (dye) | 3.5% by mass |
| Diethylene glycol | 20% by mass |
| 1,5-pentanediol | 5% by mass |
| Diethyleneglycol monobuthylether | 2.5% by mass |
| Ethylene oxide adduct of acetylene glycol | 1% by mass |
| Sodium hydroxide | 1% by mass |
| 2-Pyrrolidone-5-carboxylic acid | 3% by mass |
| Deionized water | Remaining portion |

Liquid H has a pH value of 3.5, a surface tension of 30 mN/m, and a viscosity of 3.1 mPa·s.

Liquid I: Second Liquid

| | |
|---|---|
| Diethylene glycol | 20% by mass |
| Ethylene oxide adduct of diglycerin | 10% by mass |
| Ethylene oxide adduct of acetylene glycol | 1% by mass |
| Deionized water | Remaining portion |

Liquid I has a pH value of 5.3, a surface tension of 31 mN/m, and a viscosity of 2.8 mPa·s.

Evaluation

In order to print an image, a printing method is conducted in which the second liquid is ejected onto C$^2$ paper (trade name, manufactured by Fuji Xerox Co., Ltd.) and then the first liquid is ejected thereon by using a piezo print head serving as a trial product and having 256 nozzles and a resolution of 800 dpi. Images are printed in a single-sided printing mode and a double-sided printing mode while the application amounts of the first liquid and the second liquid per unit area are controlled in accordance with the following Tables 1 to 3. Then, the obtained images are evaluated. These printing processes are carried out under ambient conditions (temperature of 23±0.5° C. and humidity of 55±5% R.H.)

Figure 3:
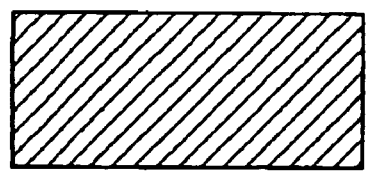
FIG. 3 A schematic view of image pattern A provided by the first liquid and the second liquid of the invention.
Figure 4:
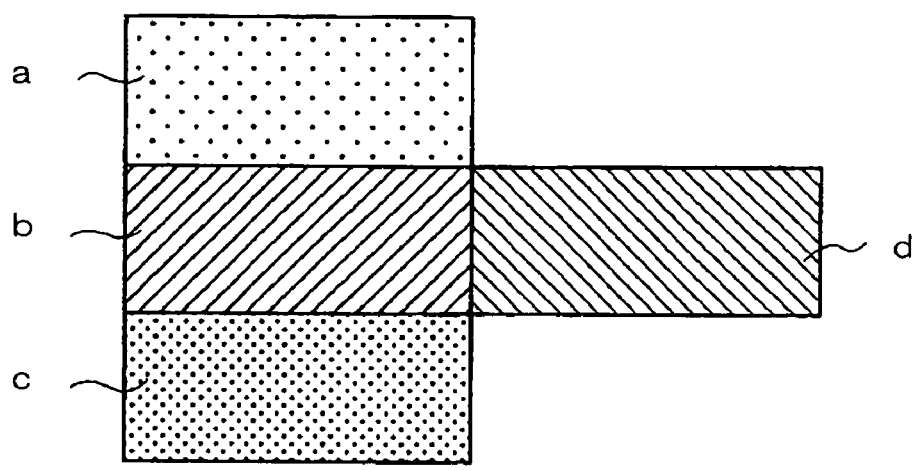
FIG. 4 A schematic view of image pattern B provided by the first liquid and the second liquid of the invention.
Figure 5:
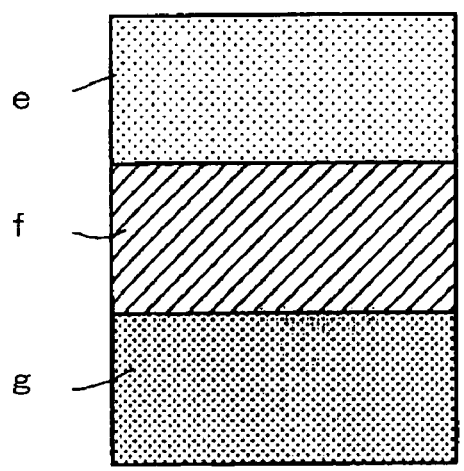
FIG. 5 A schematic view of image pattern C provided by the first liquid and the second liquid of the invention.

The above-described image printing is conducted according to a printing pattern shown in each of schematic views of FIGS. 3 to 5, and the resultant images are left under the ambient conditions for 24 hours. Then, the images are evaluated.

The image pattern A in FIG. 3 shows that an area of application of the second liquid (liquid 2), and that of the first liquid (liquid 1) completely overlap. Also the image pattern B in FIG. 4 shows complete overlap of a region in which the second liquid (liquid 2) is applied and regions in which four types of the first liquids (liquid 1, 3, 4 or 5) are applied. Region "a" is a region in which liquids 3 and 2 are applied. Region "b" is a region in which liquids 1 and 2 are applied. Region "c" is a region in which liquids 4 and 2 are applied. Region "d" is a region in which liquids 5 and 2 are applied. The image pattern C in FIG. 5 shows partial overlap of a region in which the second liquid (liquid 2) is applied, and regions in which first liquids (liquid 1, 3, or 4) are applied. Region "e" is a region in which liquid 3 is applied. Region "f" is a region in which liquids 1 and 2 are applied. Region "g" is a region in which liquid 4 is applied.

In the image pattern B shown in FIG. 4 there are 4 regions a, b, c, and d, each with the same surface area. Also in the image pattern C shown in FIG. 5 there are 3 regions e, f, and g, each with the same surface area.

EXAMPLES 1 TO 10 AND COMPARATIVE EXAMPLES 1 to 6

The tables 1 to 3 show, in Examples 1 to 10 and Comparative Examples 1 to 6, as the ink set: which of each of the liquids A to I are used to form the image patterns A to C; the type of image pattern; the value of $(RD_2 \times RM_1)/(RD_1 \times RM_2)$ for the liquids used; the value of $(RD_1/RM_1)$; the volume average particle size of the colorants in the liquids; the surface tension of the liquids used; the number of course particles 5 μm or over in size of the mixed liquid formed from the first liquid and the second liquid.

TABLE 1

| | Printed pattern | Type of liquid | | Single sided printing Application rate (g/m²) RM₁ (Top) RM₂ (Bottom) | Drop amount (ng/pixel) | Double sided printing Application rate (g/m²) RD₁ (Top) RD₂ (Bottom) | Drop amount (ng/pixel) | $RD_2 \times RM_1$ / $RD_1 \times RM_2$ | $RD_1$ / $RM_1$ | Volume average particle diameter (nm) | Surface tension | Count of 5 μm* coarse particle when mixed (particle/μl) |
|---|---|---|---|---|---|---|---|---|---|---|---|---|
| Example 1 | A | Liquid 1 | A | 12.4 | 20 | 12.4 | 20 | 0.88 | 1.00 | 82 | 31 | 980 |
| | | Liquid 2 | G | 2.4 | 4 | 2.1 | 4 | | — | | 31 | |
| Example 2 | A | Liquid 1 | A | 12.4 | 20 | 12.0 | 20 | 0.89 | 0.97 | 82 | 31 | 870 |
| | | Liquid 2 | H | 2.8 | 4 | 2.4 | 4 | | — | | 30 | |
| Example 3 | A | Liquid 1 | B | 13.2 | 20 | 12.8 | 10 | 0.86 | 0.97 | 85 | 31 | 760 |
| | | Liquid 2 | G | 2.4 | 4 | 2.0 | 4 | | — | | 31 | |
| Example 4 | A | Liquid 1 | C | 11.8 | 20 | 9.8 | 10 | 0.85 | 0.83 | 118 | 34 | 1020 |
| | | Liquid 2 | G | 2.4 | 4 | 1.7 | 4 | | — | | 31 | |
| Example 5 | A | Liquid 1 | A | 12.6 | 20 | 12.4 | 20 | 0.13 | 0.98 | 82 | 31 | 980 |
| | | Liquid 2 | G | 13.6 | 20 | 1.8 | 20 | | — | | 31 | |
| Example 6 | A | Liquid 1 | A | 12.6 | 20 | 9.0 | 20 | 0.81 | 0.71 | 82 | 31 | 980 |
| | | Liquid 2 | G | 3.8 | 4 | 2.2 | 4 | | — | | 31 | |
| Example 7 | A | Liquid 1 | A | 12.6 | 20 | 6.0 | 10 | 0.66 | 0.48 | 82 | 31 | 980 |
| | | Liquid 2 | G | 3.8 | 4 | 1.2 | 4 | | — | | 31 | |
| Example 8 | A | Liquid 1 | A | 12.8 | 20 | 11.3 | 10 | 0.48 | 0.88 | 82 | 31 | 980 |
| | | Liquid 2 | G | 3.8 | 4 | 1.6 | 4 | | — | | 31 | |

TABLE 2

| | Printed pattern | Type of liquid | | Single sided printing Application rate (g/m²) RM₁ (Top) RM₂ (Bottom) | Drop amount (ng/pixel) | Double sided printing Application rate (g/m²) RD₁ (Top) RD₂ (Bottom) | Drop amount (ng/pixel) | $RD_2 \times RM_1$ / $RD_1 \times RM_2$ | $RD_1$ / $RM_1$ | Volume average particle diameter (nm) | Surface tension | Count of 5 μm* coarse particle when mixed (particle/μl) |
|---|---|---|---|---|---|---|---|---|---|---|---|---|
| Comparative example 1 | A | Liquid 1 | A | 12.4 | 20 | 12.4 | 20 | 1.00 | 1.00 | 82 | 31 | 980 |
| | | Liquid 2 | G | 2.4 | 4 | 2.4 | 4 | | — | | 31 | |
| Comparative example 2 | A | Liquid 1 | A | 12.4 | 20 | 12.4 | 20 | 1.25 | 1.00 | 82 | 31 | 870 |
| | | Liquid 2 | H | 2.8 | 4 | 3.5 | 4 | | — | | 30 | |
| Comparative example 3 | A | Liquid 1 | B | 13.2 | 40 | 13.2 | 40 | 1.08 | 1.00 | 85 | 31 | 760 |
| | | Liquid 2 | G | 2.4 | 4 | 2.6 | 4 | | — | | 31 | |
| Comparative example 4 | A | Liquid 1 | A | 12.4 | 20 | 12.0 | 10 | 1.03 | 0.97 | 82 | 31 | 5 |
| | | Liquid 2 | I | 2.6 | 4 | 2.6 | 4 | | — | | 31 | |
| Comparative example 5 | A | Liquid 1 | A | 1.1 | 2 | 12.4 | 20 | 0.008 | 11.3 | 82 | 31 | 980 |
| | | Liquid 2 | G | 12.6 | 20 | 1.2 | 2 | | — | | 31 | |
| Comparative example 6 | A | Liquid 1 | A | 12.4 | 20 | 1.1 | 2 | 11.27 | 0.09 | 82 | 31 | 980 |
| | | Liquid 2 | G | 2.4 | 4 | 2.4 | 4 | | — | | 31 | |
| Comparative example 7 | A | Liquid 1 | A | 12.4 | 20 | 13.6 | 28 | 1.06 | 1.10 | 82 | 31 | 980 |
| | | Liquid 2 | G | 2.4 | 4 | 2.8 | 4 | | — | | 31 | |

TABLE 3

| | Printed pattern | Type of liquid | | Single sided printing Application rate (g/m²) | Drop amount (ng/pixel) | Double sided printing Application rate (g/m²) | Drop amount (ng/pixel) | $RD_2 \times RM_1$ / $RD_1 \times RM_2$ | $RD_1$ / $RM_1$ | Volume average particle diameter (nm) | Surface tension | Count of 5 μm* coarse particle when mixed (particle/μl) |
|---|---|---|---|---|---|---|---|---|---|---|---|---|
| Example 9 | B | Liquid 1 | A | 12.4 (RM₁) | 20 | 12.4 (RD₁) | 20 | 0.92 | 1.00 | 82 | 31 | 980 |
| | | Liquid 2 | G | 2.4 (RM₂) | 4 | 2.2 (RD₂) | 4 | — | — | | 31 | — |
| | | Liquid 3 | D | 13.6 (RM₁) | 20 | 13.6 (RD₁) | 20 | 0.92 | 1.00 | 82 | 32 | 620 |
| | | Liquid 4 | E | 13.2 (RM₁) | 20 | 13.2 (RD₁) | 20 | 0.92 | 1.00 | 118 | 32 | 710 |
| | | Liquid 5 | F | 11.8 (RM₁) | 20 | 11.8 (RD₁) | 20 | 0.92 | 1.00 | 138 | 32 | 880 |
| Example 10 | C | Liquid 1 | A | 12.4 (RM₁) | 20 | 12.2 (RD₁) | 20 | 0.86 | 0.98 | 82 | 31 | 870 |
| | | Liquid 2 | H | 2.8 (RM₂) | 4 | 2.4 (RD₂) | 20 | — | — | | 30 | — |
| | | Liquid 3 | E | 13.2 (RM₁) | 20 | 13.0 (RD₁) | 20 | 0.87 | 0.98 | 118 | 30 | — |
| | | Liquid 4 | F | 11.8 (RM₁) | 20 | 11.6 (RD₁) | 20 | 0.87 | 0.98 | 138 | 32 | — |
| Comparative example 8 | B | Liquid 1 | A | 12.4 (RM₁) | 20 | 12.4 (RD₁) | 20 | 1.08 | 1.00 | 82 | 31 | 980 |
| | | Liquid 2 | G | 2.4 (RM₂) | 4 | 2.6 (RD₂) | 4 | — | — | | 31 | — |
| | | Liquid 3 | D | 13.6 (RM₁) | 20 | 13.6 (RD₁) | 20 | 1.08 | 1.00 | 82 | 32 | 620 |
| | | Liquid 4 | E | 13.2 (RM₁) | 20 | 13.2 (RD₁) | 20 | 1.08 | 1.00 | 118 | 32 | 710 |
| | | Liquid 5 | F | 11.8 (RM₁) | 20 | 11.8 (RD₁) | 20 | 1.08 | 1.00 | 138 | 32 | 880 |

TABLE 3-continued

|  | Printed pattern | Type of liquid | Application rate (g/m²) | Single sided printing Drop amount (ng/ pixel) | Application rate (g/m²) | Double sided printing Drop amount (ng/ pixel) | $RD_2 \times RM_1$ $RD_1 \times RM_2$ | $RD_1$ $RM_1$ | Volume average particle diameter (nm) | Surface tension | Count of 5 μm* coarse particle when mixed (particle/μl) |
|---|---|---|---|---|---|---|---|---|---|---|---|
| Comparative example 9 | C | Liquid 1 | A 12.4 (RM₁) | 20 | 12.2 (RD₁) | 20 | 0.87 | 0.98 | 82 | 31 | 32 |
|  |  | Liquid 2 | D 2.8 (RM₂) | 20 | 2.4 (RD₂) | 20 | — | — | 82 | 32 | — |
|  |  | Liquid 3 | E 13.2 (RM₁) | 20 | 13.0 (RD₁) | 20 | 0.87 | 0.98 | 118 | 32 | 18 |
|  |  | Liquid 4 | F 11.8 (RM₁) | 20 | 11.6 (RD₁) | 20 | 0.87 | 0.98 | 138 | 32 | 22 |

Dirt on Images

Continuous runs of 100 prints of charts incorporating 100% coverage patterns with the image patterns A to C, as shown in FIGS. 3 to 5, were printed, and the 100$^{th}$ image was compared with the 1$^{st}$ image. The results are shown in Tables 4 and 5.

Evaluation Criteria
A: Absolutely no dirty image arose
B: Virtually no dirty image arose
C: Dirty image arose—but within allowable tolerance
D: Dirty image arose—outside allowable tolerance Optical Density The optical density of a printing portion of each of samples having an image printed in accordance with the patterns A to C of FIGS. 3 to 5 is measured with X-RITE 404 (trade name, manufactured by X-Rite, Inc,) and the measured value is evaluated in accordance with the following criteria. When the image of a sample has a portion whose evaluation result is "C" and the other portion whose evaluation result is "B", the sample as a whole is evaluated as "C". This is also applied to evaluation items other than optical density. Results are shown in Tables 4 and 5.

Evaluation Criteria for Black Inks
A: Optical density is 1.45 or more.
B: Optical density is at least 1.4 and less than 1.45.
C: Optical density is at least 1.3 and less than 1.4.
D: Optical density is less than 1.3.

Evaluation Criteria for Color Inks
A: Optical density is 1.2 or more.
B: Optical density is at least 1.1 and less than 1.2.
C: Optical density is at least 1.0 and less than 1.1.
D: Optical density is less than 1.0 (unacceptable optical density).

Intercolor Bleeding

The evaluation of intercolor bleeding is made by printing a pattern with adjacent different colors (in FIGS. 4 and 5 the patterns B and C). The boundary area is checked for the degree of bleeding against previously prepared borderline case samples by eye. The results are shown in Table 5.

Evaluation Criteria
A: Bleeding is not perceptible.
B: Bleeding slightly occurs.
C: Bleeding occurs but the degree thereof is acceptable.
D: Significant bleeding occurs and the degree thereof is unacceptable.

Bleeding (Feathering)

The evaluation of bleeding is made by printing patterns A to C as shown in FIGS. 3, 4 and 5. Then the degree of bleeding of the following boundaries were checked against previously prepared borderline case samples by eye: the printed region and non-printed region boundary of image pattern A in FIG. 3; the printed region b and non-printed region boundary of image pattern B in FIG. 4; the printed region f and non-printed region boundary of image pattern C in FIG. 5. The results are shown in Tables 4 and 5.

Evaluation Criteria
A: Bleeding is not perceptible.
B: Bleeding slightly occurs.
C: Bleeding occurs but the degree thereof is acceptable.
D: Significant bleeding occurs and the degree thereof is unacceptable.

Drying Time

The evaluation of drying time is made by printing images of the patterns A to C as shown in FIGS. 3, 4 and 5, with 100% coverage patterns. Then, after a predetermined period of time has elapsed, a separate sheet of C² paper is placed on and applied with a force of $1.9 \times 10^4$ N/m². The drying time is the time elapsed until no liquid is transferred to the applied sheet of C² paper. The results are shown in Tables 4 and 5.

Evaluation Criteria
A: Drying time is less than 0.5 seconds
B: Drying time is 0.5 seconds or more but less than 1 second
C: Drying time is 1 second or more but less than 3 seconds
D: Drying time is 3 seconds or more (unacceptable)

TABLE 4

|  |  | Dirt on image | Optical density | Bleeding | Drying time |
|---|---|---|---|---|---|
| Example 1 | Single sided printing | A | A | A | A |
|  | Double sided printing | B | A | A | B |
| Example 2 | Single sided printing | A | A | A | A |
|  | Double sided printing | B | A | A | B |
| Example 3 | Single sided printing | A | A | A | A |
|  | Double sided printing | B | A | A | B |
| Example 4 | Single sided printing | A | A | A | A |
|  | Double sided printing | A | A | A | A |

TABLE 4-continued

|  |  | Dirt on image | Optical density | Bleeding | Drying time |
|---|---|---|---|---|---|
| Example 5 | Single sided printing | B | A | B | B |
|  | Double sided printing | B | B | A | B |
| Example 6 | Single sided printing | A | A | A | A |
|  | Double sided printing | A | A | A | A |
| Example 7 | Single sided printing | A | A | A | A |
|  | Double sided printing | A | B | A | B |
| Example 8 | Single sided printing | A | A | A | A |
|  | Double sided printing | B | B | A | A |
| Comparative example 1 | Single sided printing | A | A | A | A |
|  | Double sided printing | D | A | A | C |
| Comparative example 2 | Single sided printing | A | A | A | A |
|  | Double sided printing | D | A | A | C |
| Comparative example 3 | Single sided printing | A | A | C | A |
|  | Double sided printing | D | A | C | C |
| Comparative example 4 | Single sided printing | B | D | D | B |
|  | Double sided printing | B | D | D | B |
| Comparative example 5 | Single sided printing | A | D | A | B |
|  | Double sided printing | A | B | A | B |
| Comparative example 6 | Single sided printing | A | A | A | A |
|  | Double sided printing | A | D | A | A |
| Comparative example 7 | Single sided printing | A | A | A | A |
|  | Double sided printing | D | A | C | D |

TABLE 5

|  |  | Dirt on image | Optical density | Bleeding | Inter color bleeding | Drying time |
|---|---|---|---|---|---|---|
| Example 9 | Single sided printing | A | A | A | A | A |
|  | Double sided printing | B | A | A | A | B |
| Example 10 | Single sided printing | A | A | A | A | A |
|  | Double sided printing | B | A | A | A | B |
| Comparative example 8 | Single sided printing | A | A | A | A | A |
|  | Double sided printing | D | B | B | B | C |
| Comparative example 9 | Single sided printing | A | D | D | C | A |
|  | Double sided printing | A | D | D | C | A |

As is shown in the Tables 4 and 5, in the ink jet recording method of the invention and the ink jet recording apparatus of the invention, the liquids which correspond to the first liquid and the second liquid, printed by ejecting onto the recording medium so that they make contact with each other, as in the Examples 1 to 10, form images which are superior images with sufficient optical density, no dirty images, and no bleeding or intercolor bleeding. As well as this the drying time is sufficiently short.

In comparison it is clear that, as shown in the Tables 4 and 5, the liquids which correspond to the first liquid and the second liquid, printed by ejecting onto the recording medium so that they make contact with each other as in the Comparative Examples 1 to 9, form images which are unacceptable in terms of at least one of optical density, dirty images, bleeding, intercolor bleeding or drying time.

What is claimed is:

1. An ink jet recording method which prints out by ejecting onto a recording medium an ink set for ink jet use, wherein:
   the ink set comprises a first liquid comprising a colorant, a water soluble solvent and water; and a second liquid comprising a coagulating agent, a water soluble solvent and water;
   recording in a double sided print mode and recording in a single sided print mode are possible;
   and the relationship of the following Expression (1) is satisfied in both modes:

$$0.01 < \frac{RD_2 \times RM_1}{RD_1 \times RM_2} < 1 \qquad \text{Expression (1)}$$

wherein $RD_1$ is an application amount per unit area of the first liquid for the double sided printing mode; $RD_2$ is an application amount per unit area of the second liquid for the double sided printing mode; $RM_1$ is an application amount per unit area of the first liquid for the single sided printing mode; and $RM_2$ is an application amount per unit area of the second liquid for the single sided printing mode.

2. The ink jet recording method according to claim 1, wherein, for recording by printing of the same color, the relationship of the following expression is satisfied:

$$0.01 < RD_1/RM_1 < 1 \qquad \text{Expression (2).}$$

3. The ink jet recording method according to claim 1, wherein control so that Expression (1) is satisfied includes adjusting at least one of the group consisting of a number of pixels applied by the first liquid and a number of pixels applied by the second liquid.

4. The ink jet recording method according to claim 1, wherein control so that Expression (1) is satisfied includes adjusting at least one of the group consisting of an amount of the first liquid applied per pixel and of an amount of the second liquid applied per pixel.

5. The ink jet recording method according to claim 4, wherein the adjusting at least one of the group consisting of the amount of the first liquid applied per pixel and of the amount of the second liquid applied per pixel includes changing the amount of the liquid, the amount of which is adjusted, by altering a wave form of a voltage applied to the liquid, the amount of which is adjusted.

6. The ink jet recording method according to claim 1, wherein the amounts of the first liquid and the second liquid applied per pixel are each in a range of about 0.01 to 25 ng.

7. The ink jet recording method according to claim 1, wherein, in the single sided printing mode, the ratio by mass of the amount of the first liquid per pixel to the second liquid applied per pixel is in a range of about 100:5 to 100:100; and, in the double sided printing mode, the ratio by mass of the amount of the first liquid per pixel to the second liquid applied per pixel is in a range of about 100:1 to 100:50.

8. The ink jet recording method according to claim 1, wherein the first liquid comprises a high-molecular substance.

9. The ink jet recording method according to claim 8, wherein an acid value of the high-molecular substance is in a range of about 30 to 150 KOH mg/g.

10. The ink jet recording method according to claim 8, wherein the acid value of the high-molecular substance is in a range of about 150 to 1000 KOH mg/g, and a degree of neutralization of the high-molecular substance is 20% to 80%.

11. The ink jet recording method according to claim 1, wherein the colorant is a pigment, and the pigment is at least one selected from the group consisting of a pigment that is dispersed by using a polymer dispersing agent, a self-dispersible pigment dispersible in water, a resin-coated pigment, and a polymer graft pigment.

12. The ink jet recording method according to claim 1, wherein a volume average particle diameter of the colorant is in a range of about 30 to 250 nm.

13. The ink jet recording method according to claim 1, wherein a surface tension of the first liquid is in a range of about 20 to 60 mN/m.

14. An ink jet recording apparatus which is provided with a recording head which ejects onto a recording medium an ink set for ink jet use, wherein:

the ink set comprises a first liquid comprising a colorant, a water soluble solvent and water; and a second liquid comprising a coagulating agent, a water soluble solvent and water;

recording in a double sided print mode and recording in a single sided print mode are possible;

and the relationship of the following Expression (1) is satisfied in both modes:

$$0.01 < \frac{RD_2 \times RM_1}{RD_1 \times RM_2} < 1 \quad \text{Expression (1)}$$

wherein $RD_1$ is an application amount per unit area of the first liquid for the double sided printing mode; $RD_2$ is an application amount per unit area of the second liquid for the double sided printing mode; $RM_1$ is an application amount per unit area of the first liquid for the single sided printing mode; and $RM_2$ is an application amount per unit area of the second liquid for the single sided printing mode.

15. The ink jet recording apparatus according to claim 14, wherein, for recording by printing of the same color, the relationship of the following expression is satisfied:

$$0.01 < RD_1/RM_1 < 1 \quad \text{Expression (2)}.$$

16. The ink jet recording apparatus according to claim 14, wherein a device which conducts control so that Expression (1) is satisfied by adjusting at least one of the group consisting of a number of pixels applied by the first liquid and a number of pixels applied by the second liquid is further provided therewith.

17. The ink jet recording apparatus according to claim 14, wherein a device which conducts control so that Expression (1) is satisfied by adjusting at least one of the group consisting of an amount of the first liquid applied per pixel and of an amount of the second liquid applied per pixel is further provided therewith.

18. The ink jet recording apparatus according to claim 17, wherein a device which conducts the adjusting at least one of the group consisting of the amount of the first liquid applied per pixel and of the amount of the second liquid applied per pixel by changing the amount of the liquid, the amount of which is adjusted, by altering a wave form of a voltage applied to the liquid, the amount of which is adjusted is further provided therewith.

19. The ink jet recording apparatus according to claim 14, wherein the amounts of the first liquid and the second liquid applied per pixel are each in a range of about 0.01 to 25 ng.

20. The ink jet recording apparatus according to claim 14, wherein, in the single sided printing mode, the ratio by mass of the amount of the first liquid per pixel to the second liquid applied per pixel is in a range of about 100:5 to 100:100; and, in the double sided printing mode, the ratio by mass of the amount of the first liquid per pixel to the second liquid applied per pixel is in a range of about 100:1 to 100:50.

* * * * *